United States Patent
An et al.

(10) Patent No.: US 12,421,334 B2
(45) Date of Patent: *Sep. 23, 2025

(54) HYBRID SUPPORTED METALLOCENE CATALYST AND METHOD OF PREPARING POLYPROPYLENE USING THE SAME

(71) Applicant: LG Chem, Ltd., Seoul (KR)

(72) Inventors: Sangeun An, Daejeon (KR); Insun Lee, Daejeon (KR); Seok Hwan Kim, Daejeon (KR); Byung Seok Kim, Daejeon (KR); Daesik Hong, Daejeon (KR); Sanghoon Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 494 days.

This patent is subject to a terminal disclaimer.

(21) Appl. No.: 17/438,174

(22) PCT Filed: Jun. 11, 2020

(86) PCT No.: PCT/KR2020/007548
§ 371 (c)(1),
(2) Date: Sep. 10, 2021

(87) PCT Pub. No.: WO2020/251265
PCT Pub. Date: Dec. 17, 2020

(65) Prior Publication Data
US 2022/0144983 A1    May 12, 2022

(30) Foreign Application Priority Data

Jun. 13, 2019  (KR) .......................... 10-2019-0069973
Oct. 7, 2019   (KR) .......................... 10-2019-0123776
Jun. 10, 2020  (KR) .......................... 10-2020-0070125

(51) Int. Cl.
*C08F 110/06*   (2006.01)
*C07F 17/00*    (2006.01)

(52) U.S. Cl.
CPC ............ *C08F 110/06* (2013.01); *C07F 17/00* (2013.01); *C08F 2420/00* (2013.01)

(58) Field of Classification Search
CPC ...... C07F 17/00; C08F 4/6465; C08F 4/6496; C08F 2420/00; C08F 2420/07; C08F 4/65904; C08F 4/65927
See application file for complete search history.

(56) References Cited

U.S. PATENT DOCUMENTS 6,117,962 A   9/2000  Weng et al.
6,469,114 B1  10/2002 Schottek et al.
(Continued)

FOREIGN PATENT DOCUMENTS

CN  1274367 A  11/2000
CN  1697843 A  11/2005
(Continued)

OTHER PUBLICATIONS

Partial Supplementary European Search Report for Application No. 20822420.4 dated Aug. 2, 2022. 12 pgs.
(Continued)

Primary Examiner — Alexander R Pagano
Assistant Examiner — Frank S. Hou
(74) Attorney, Agent, or Firm — Lerner David LLP

(57) ABSTRACT

Provided are a hybrid supported metallocene catalyst comprising one or more first metallocene compounds selected from compounds represented by the following Chemical Formula 1; one or more second metallocene compounds selected from compounds represented by the following Chemical Formula 2, and showing high activity in propylene polymerization and being usefully applied to the preparation of a polypropylene having high melt strength by introducing long chain branches into the polypropylene molecule, and a method of preparing a polypropylene using the same

[Chemical Formula 1]

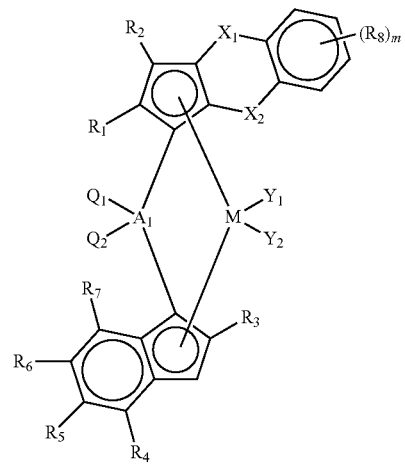

[Chemical Formula 2]

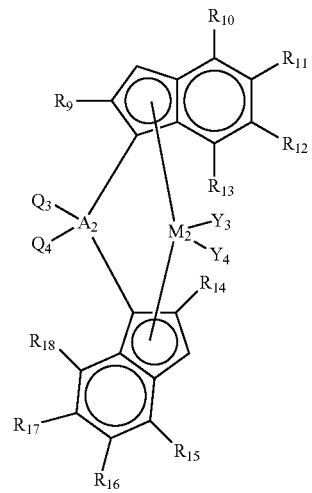

wherein all the variables are described herein.

18 Claims, No Drawings

(56) References Cited

U.S. PATENT DOCUMENTS

| | | | |
|---|---|---|---|
| 7,109,278 B2* | 9/2006 | Okumura | C07F 17/00 502/103 |
| 2006/0100401 A1 | 5/2006 | Martin et al. | |
| 2006/0235171 A1 | 10/2006 | Lee et al. | |
| 2007/0155919 A1 | 7/2007 | Okumura et al. | |
| 2007/0260025 A1 | 11/2007 | Elder et al. | |
| 2010/0106513 A1 | 4/2010 | Dillon et al. | |
| 2010/0292421 A1 | 11/2010 | Bando | |
| 2014/0114031 A1 | 4/2014 | Bando et al. | |
| 2015/0031844 A1 | 1/2015 | Lee et al. | |
| 2015/0239916 A1 | 8/2015 | Do et al. | |
| 2016/0237187 A1 | 8/2016 | Hong et al. | |
| 2016/0304639 A1* | 10/2016 | Bader | C08F 4/65904 |
| 2018/0134816 A1 | 5/2018 | Canich et al. | |
| 2018/0273669 A1 | 9/2018 | Arai | |
| 2018/0346618 A1 | 12/2018 | Bader et al. | |
| 2018/0371116 A1 | 12/2018 | Kim et al. | |
| 2019/0106516 A1 | 4/2019 | Park et al. | |
| 2019/0135961 A1* | 5/2019 | Joung | C08F 2/00 |
| 2019/0263942 A1 | 8/2019 | Jeong et al. | |
| 2020/0140583 A1 | 5/2020 | Kim et al. | |
| 2021/0332075 A1* | 10/2021 | Lee | C07F 17/00 |
| 2022/0144983 A1 | 5/2022 | An et al. | |

FOREIGN PATENT DOCUMENTS

| | | |
|---|---|---|
| CN | 1890272 A | 1/2007 |
| CN | 101868471 A | 10/2010 |
| CN | 104797586 A | 7/2015 |
| CN | 105985372 A * | 10/2016 |
| CN | 106488923 A | 3/2017 |
| CN | 107108674 A | 8/2017 |
| CN | 109071699 A | 12/2018 |
| CN | 109369837 A | 2/2019 |
| CN | 109415450 A | 3/2019 |
| EP | 3925987 A1 | 12/2021 |
| JP | H11130807 A | 5/1999 |
| JP | 2002535416 A | 10/2002 |
| JP | 2007511475 A | 5/2007 |
| JP | 2010242015 A | 10/2010 |
| JP | 2011236375 A | 11/2011 |
| JP | 2013100558 A | 5/2013 |
| JP | 2019059933 A | 4/2019 |
| KR | 20010031058 A | 4/2001 |
| KR | 100579843 B1 | 5/2006 |
| KR | 20060123293 A | 12/2006 |
| KR | 20100076056 A | 7/2010 |
| KR | 101139268 B1 | 7/2012 |
| KR | 2016009264 * | 1/2016 |
| KR | 20160009264 A | 1/2016 |
| KR | 20160009265 A | 1/2016 |
| KR | 20160097254 A | 8/2016 |
| KR | 20170073463 A | 6/2017 |
| KR | 20170075533 A | 7/2017 |
| KR | 101773722 B1 | 8/2017 |
| KR | 20180051222 * | 5/2018 |
| KR | 20180051222 A | 5/2018 |
| KR | 20180067939 A | 6/2018 |
| KR | 20190062163 A | 6/2019 |
| KR | 20200093356 A | 8/2020 |
| KR | 20200143272 A | 12/2020 |
| KR | 20210020831 A | 2/2021 |
| WO | 9929743 A1 | 6/1999 |
| WO | 2017056946 A1 | 4/2017 |
| WO | 2018110915 A1 | 6/2018 |

OTHER PUBLICATIONS

Search report from International Application No. PCT/KR2020/007486, mailed Sep. 28, 2020. 2 pgs.

Search Report from International Application No. PCT/KR2020/007548, mailed Sep. 23, 2020. 3 pgs.

Busico V and Cipullo R., Microstructure of Polypropylene. Progress in Polymer Science 26. (2001). 91 pgs.

Extended European Search Report including Written Opinion for Application No. 20822420.4 dated Oct. 25, 2022, pp. 1-12.

Extended European Search Report including Written Opinion for Application No. 20822860.1 dated Mar. 30, 2022, pp. 1-9.

* cited by examiner

HYBRID SUPPORTED METALLOCENE CATALYST AND METHOD OF PREPARING POLYPROPYLENE USING THE SAME

CROSS-REFERENCE TO RELATED APPLICATIONS

The present application is a national stage entry under 35 U.S.C. § 371 of International Application No. PCT/KR2020/007548 filed on Jun. 11, 2020, which claims priority from Korean Patent Application No. 10-2019-0069973 filed on Jun. 13, 2019, Korean Patent Application No. 10-2019-0123776 filed on Oct. 7, 2019, and Korean Patent Application No. 10-2020-0070125 filed on Jun. 10, 2020, the disclosure of all of which are incorporated herein by reference.

TECHNICAL FIELD

The present invention relates to a hybrid supported metallocene catalyst, and a method of preparing a polypropylene using the same.

BACKGROUND

Olefin polymerization catalyst systems may be divided into Ziegler-Natta and metallocene catalyst systems. These highly active catalyst systems have been developed in accordance with their characteristics.

The Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Since a compositional distribution of comonomers is not uniform, there is a problem in that it is difficult to obtain desired physical properties.

On the other hand, the metallocene catalyst consists of a combination of a main catalyst having a transition metal compound as a main component and an organometallic compound cocatalyst having aluminum as a main component. Such a catalyst is a single active site catalyst which is a homogeneous complex catalyst, and offers a polymer having a narrow molecular weight distribution and a uniform compositional distribution of comonomers, due to the single active site characteristics. The tacticity, copolymerization characteristics, molecular weight, crystallinity, and the like. of the resulting polymer may be controlled by changing a ligand structure of the catalyst and polymerization conditions.

Recent changes in environmental awareness are seeking to reduce generation of volatile organic compounds (VOCs) in many product groups. However, Ziegler-Natta catalysts (Z/N) used in the preparation of polypropylene have a problem of generating high total volatile organic compounds (TVOCs). In particular, although most of various commercially available polypropylenes are products to which Ziegler-Natta catalysts are applied, polypropylenes are being converted more and more into products with less odor and low elution characteristics, to which metallocene catalysts are applied.

In particular, existing polypropylenes are general-purpose resins, and have advantages of being lightweight due to low density and of having high stiffness and heat resistance and low hygroscopicity, but have disadvantages of low impact strength and melt strength. Moreover, a current commercial process of producing polypropylenes with high melt strength is mostly performed in a post-treatment stage, that is, post-modification (Irradiation, Grafted polymerization as crosslinking). There has been a continuous demand for a technology to prepare polypropylenes, into which long chain branches are introduced, in a reactor by applying a catalyst technology.

Accordingly, it is necessary to develop a method of preparing polypropylenes with high melt strength by introducing long chain branches (LCB) into the polypropylene molecule using a metallocene-based catalyst exhibiting high activity in the propylene polymerization.

DETAILED DESCRIPTION OF THE INVENTION

Technical Problem

There is provided a hybrid supported metallocene catalyst which is useful in the preparation of a polypropylene having relatively high melt strength, while having superior catalytic activity in propylene polymerization.

There is also provided a method of preparing a polypropylene using the hybrid supported metallocene catalyst.

Technical Solution

Provided is a hybrid supported metallocene catalyst including one or more first metallocene compounds selected from compounds represented by the following Chemical Formula 1; one or more second metallocene compounds selected from compounds represented by the following Chemical Formula 2; and a carrier supporting the first and second metallocene compounds:

[Chemical Formula 1]

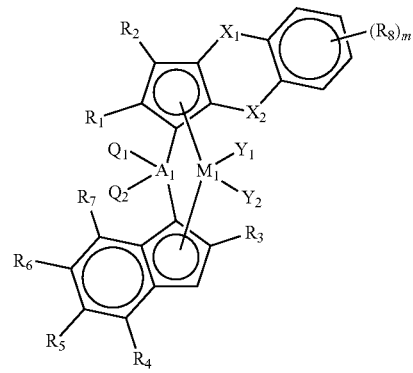

in Chemical Formula 1,
$M_1$ is a Group 4 transition metal,
$A_1$ is carbon (C), silicon (Si), or germanium (Ge),
$Q_1$ and $Q_2$ are each independently $C_{1-20}$ alkyl,
$R_1$ to $R_3$ are each independently $C_{1-20}$ alkyl,
$R_4$ is $C_{6-20}$ aryl unsubstituted or substituted with $C_{1-20}$ alkyl,
$R_5$ to $R_7$ are each independently any one of hydrogen, $C_{1-20}$ alkyl, $C_{2-20}$ alkenyl, $C_{6-30}$ aryl, $C_{7-30}$ alkylaryl, or $C_{7-30}$ arylalkyl, or two neighboring groups of the $R_5$ to $R_7$ are connected to each other to form an aliphatic ring group,
$R_8$ is any one of hydrogen, $C_{1-20}$ alkyl, $C_{2-20}$ alkenyl, $C_{6-30}$ aryl, $C_{7-30}$ alkylaryl, or $C_{7-30}$ arylalkyl, $X_1$ and $X_2$ are each independently a single bond, or S or $CR_aR_b$, wherein at least one of $X_1$ or $X_2$ is S, and $R_a$ and $R_b$ are each independently any one of hydrogen, $C_{1-20}$ alkyl, $C_{2-20}$ alkenyl, $C_{6-30}$ aryl, $C_{7-30}$ alkylaryl, or $C_{7-30}$ arylalkyl, $Y_1$ and $Y_2$ are each independently halogen, and m is an integer of 1 to 4,

[Chemical Formula 2]

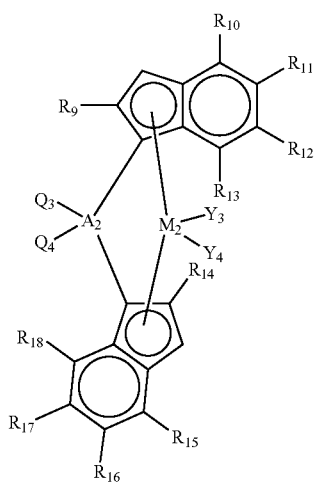

in Chemical Formula 2, $M_2$ is a Group 4 transition metal, $A_2$ is carbon (C), silicon (Si), or germanium (Ge), $Y_3$ and $Y_4$ are each independently halogen, $R_9$ and $R_{14}$ are each independently $C_{1-20}$ alkyl or $C_{6-20}$ aryl, $R_{10}$ and $R_{15}$ are each independently $C_{6-40}$ aryl unsubstituted or substituted with $C_{1-20}$ alkyl, $R_{11}$ to $R_{13}$ and $R_{16}$ to $R_{18}$ are each independently any one of hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-40}$ aryl, $C_{7-20}$ alkylaryl, or $C_{7-20}$ arylalkyl, and $Q_3$ and $Q_4$ are the same as each other, and are $C_{2-20}$ alkyl.

Further, in Chemical Formula 1, $Q_1$ and $Q_2$ are each $C_{1-6}$ alkyl, $Y_1$ and $Y_2$ are each halogen, $A_1$ is silicon (Si), and $M_1$ is zirconium (Zr) or hafnium (Hf).

Further, in Chemical Formula 1, $R_1$ to $R_3$ may be each $C_{1-6}$ linear alkyl, and specifically, may be each methyl.

Further, in Chemical Formula 1, $R_4$ may be phenyl or naphthyl unsubstituted or substituted with $C_{3-6}$ branched alkyl, and specifically, phenyl, 4-(tert-butyl)phenyl, 3,5-di-(tert-butyl)phenyl, or naphthyl.

Further, in Chemical Formula 1, $R_5$ to $R_7$ may be each hydrogen, or two neighboring groups of the $R_5$ to $R_7$ may be connected to each other to form a cyclopentyl group.

Further, in Chemical Formula 1, any one of $X_1$ or $X_2$ may be S, and the other may be a single bond.

The first metallocene compound may be represented by any one of the following structural formulae:

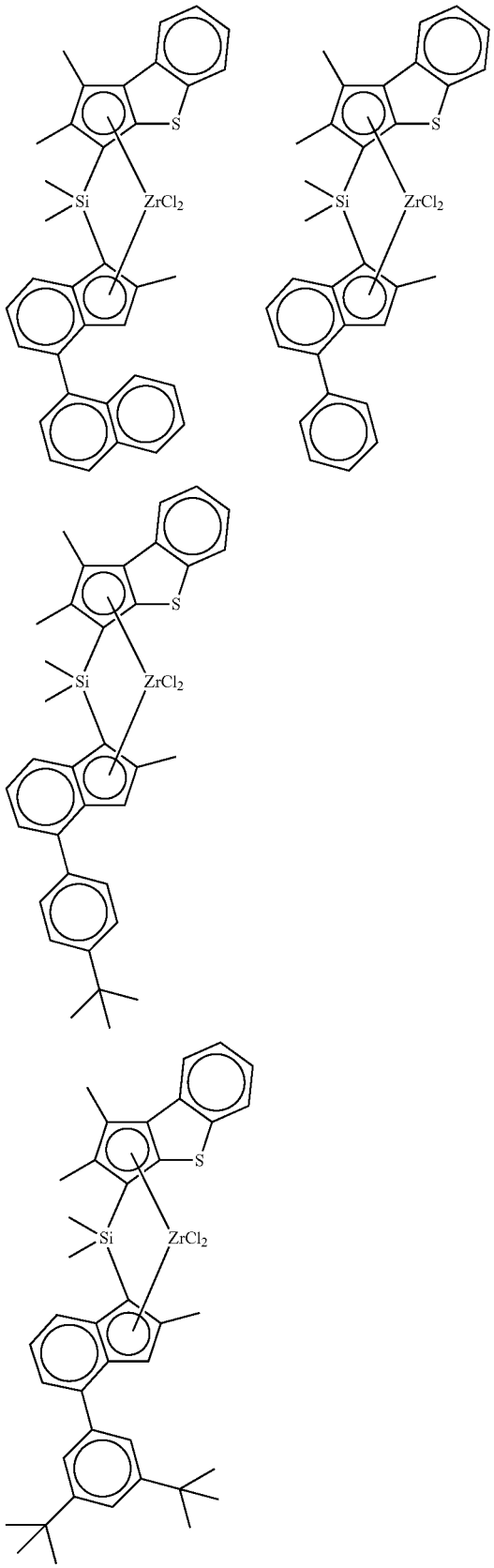

-continued
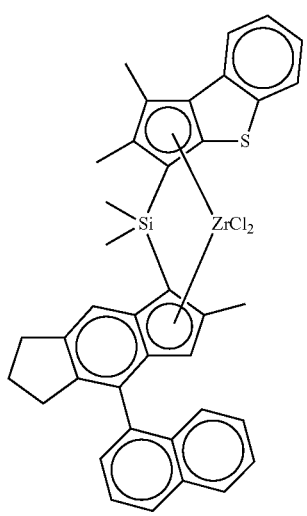
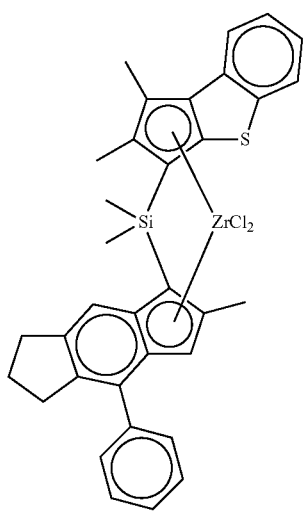
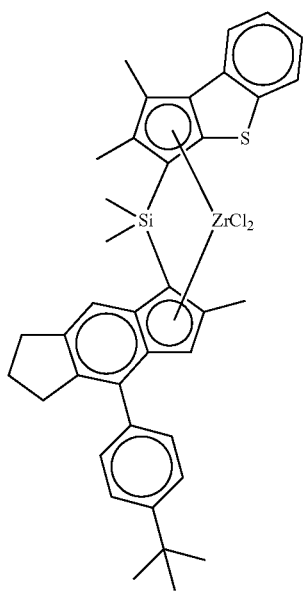
-continued
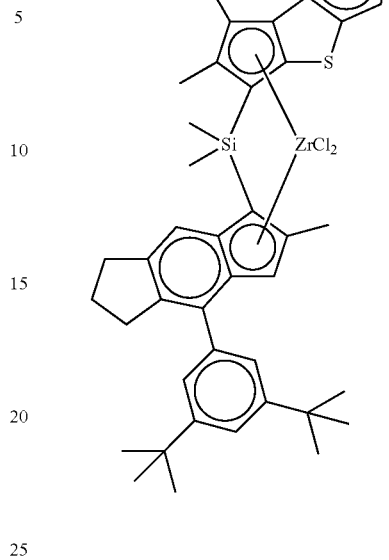
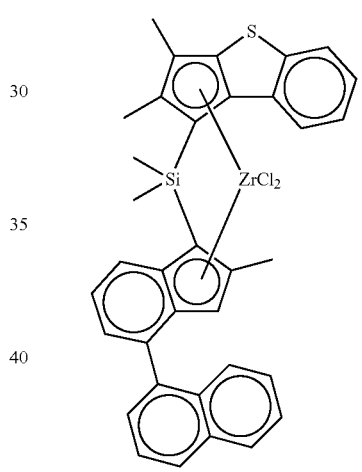
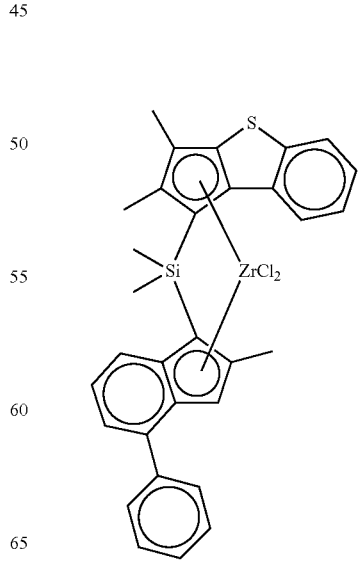

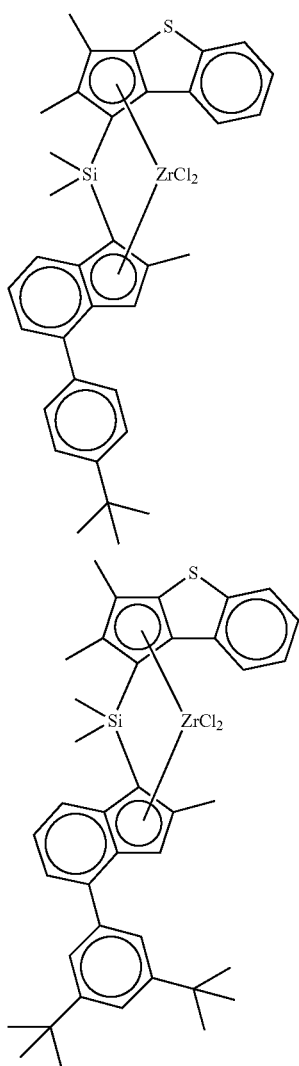
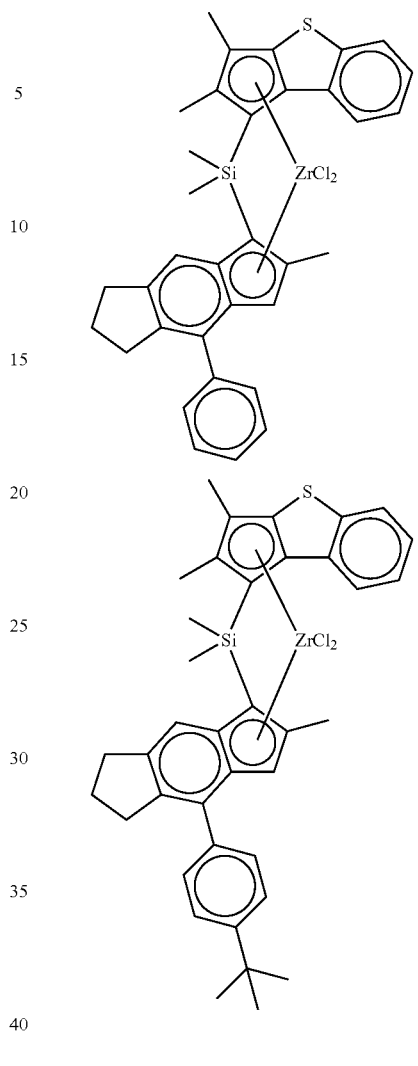
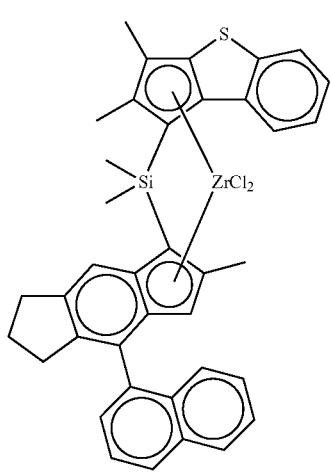
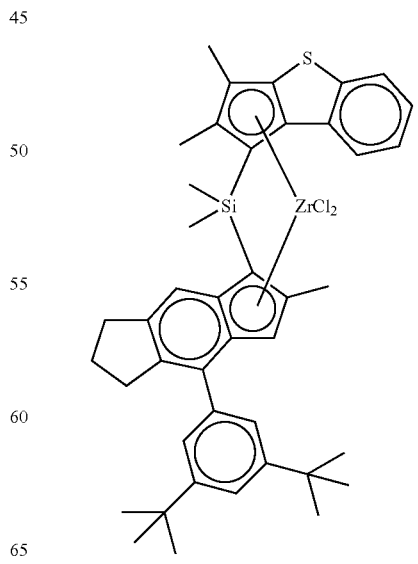

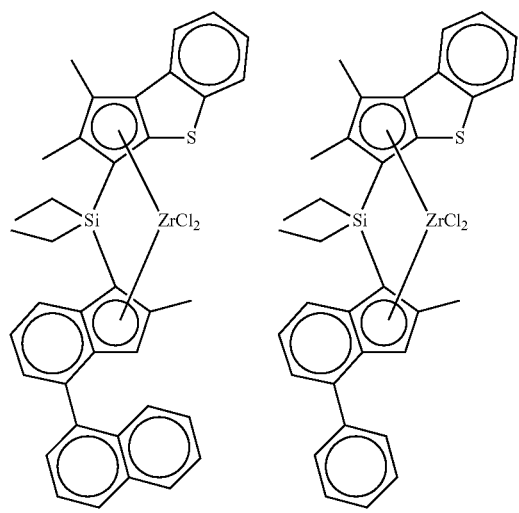
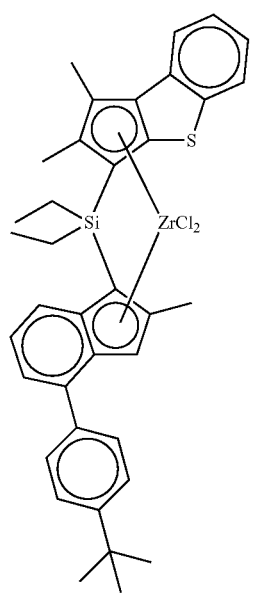
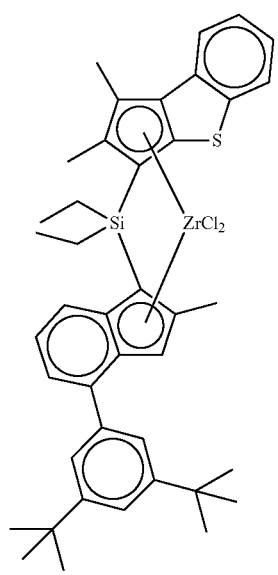
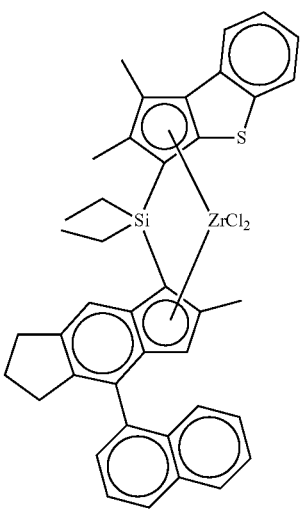
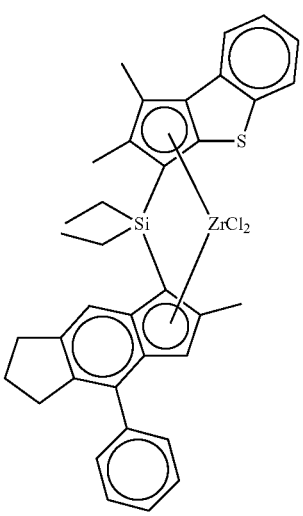

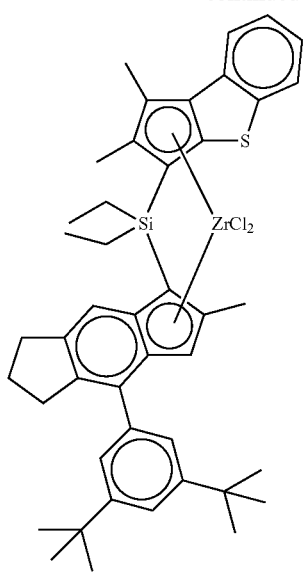
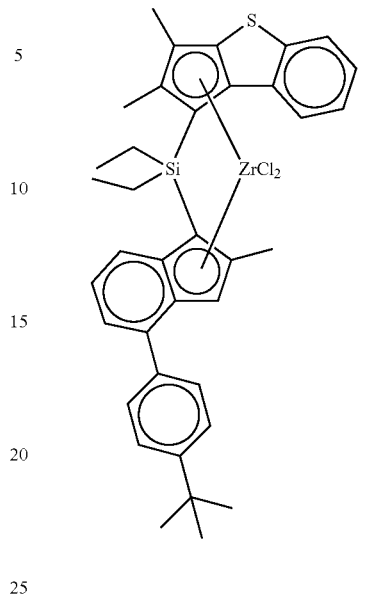
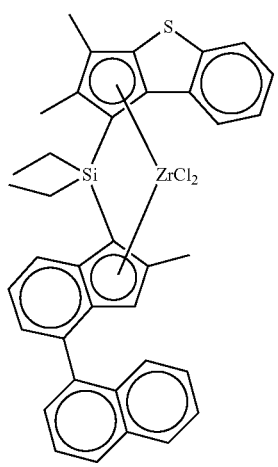
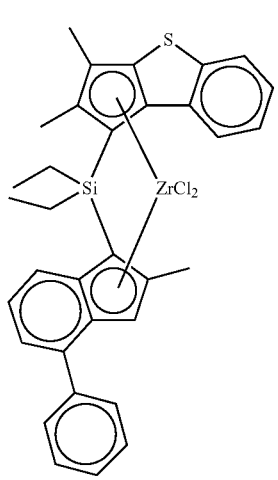
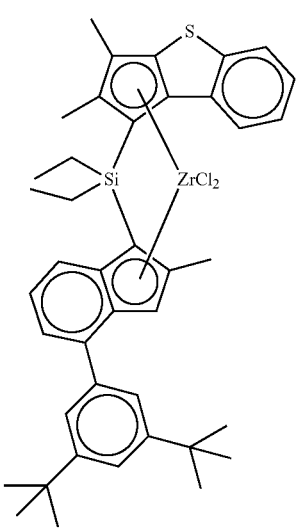

-continued

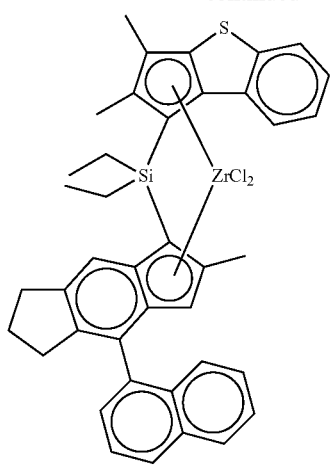

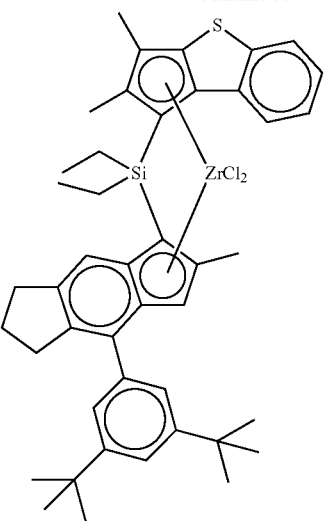

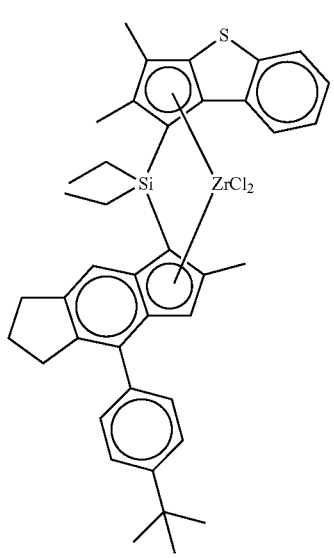

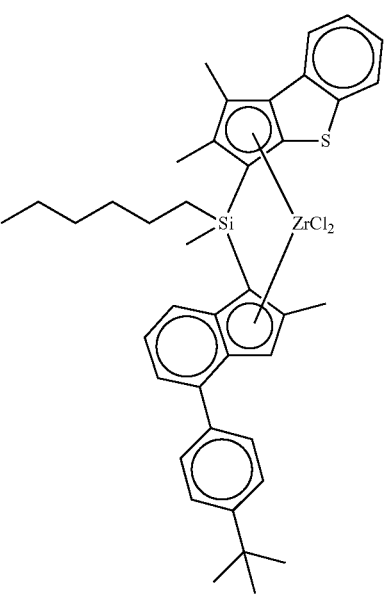

Meanwhile, in Chemical Formula 2, $Y_3$ and $Y_4$ are each halogen, $A_2$ is silicon (Si), and $M_2$ is zirconium (Zr) or hafnium (Hf).

Further, in Chemical Formula 2, $R_9$ and $R_{14}$ are the same as or different from each other, and may be each $C_{1-6}$ or $C_{1-3}$ linear or branched alkyl.

Further, in Chemical Formula 2, $R_{10}$ and $R_{15}$ are the same as or different from each other, and may be each a phenyl group substituted with a $C_{3-6}$ branched alkyl group.

Further, in Chemical Formula 2, $R_{11}$ to $R_{13}$ and $R_{16}$ to $R_{18}$ may be each hydrogen or $C_{1-6}$ linear or branched alkyl.

Further, in Chemical Formula 2, $Q_3$ and $Q_4$ are the same as each other, and may be a $C_{2-4}$ linear alkyl group, specifically, ethyl.

The second metallocene compound may be a compound represented by the following structural formula:

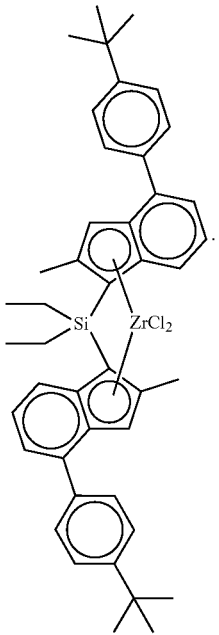

The first metallocene compound and the second metallocene compound may be supported at a molar ratio of 1:1 to 1:8.

Further, the carrier may include hydroxyl groups and siloxane groups on the surface thereof, and may be preferably one or more selected from the group consisting of silica, silica-alumina, and silica-magnesia.

Further, the hybrid supported metallocene catalyst of the present invention may further include one or more cocatalysts selected from the group consisting of compounds represented by the following Chemical Formulae 3 to 5:

—[Al($R_{31}$)—O]$_c$—  [Chemical Formula 3]

in Chemical Formula 3,
$R_{31}$ is each independently halogen, $C_{1-20}$ alkyl, or $C_{1-20}$ haloalkyl, and
c is an integer of 2 or more, D($R_{41}$)$_3$  [Chemical Formula 4]

in Chemical Formula 4,
D is aluminum or boron, and
$R_{41}$ is each independently hydrogen, halogen, $C_{1-20}$ hydrocarbyl, or halogen-substituted $C_{1-20}$ hydrocarbyl,

[L-H]$^+$[Q(E)$_4$]$^-$ or [L]$^+$[Q(E)$_4$]$^-$  [Chemical Formula 5]

in Chemical Formula 5,
L is a neutral or cationic Lewis base,
[L-H]$^+$ is a Bronsted acid,
Q is $B^{3+}$ or $Al^{3+}$, and
E is each independently $C_{6-40}$ aryl or $C_{1-20}$ alkyl, wherein $C_{6-40}$ aryl or $C_{1-20}$ alkyl is unsubstituted or substituted with one or more substituents selected from the group consisting of halogen, $C_{1-20}$ alkyl, $C_{1-20}$ alkoxy, and $C_{6-40}$ aryloxy.

Meanwhile, the present invention provides a method of preparing a polypropylene, the method including the step of polymerizing propylene monomers in the presence of the above-described hybrid supported metallocene catalyst.

In this regard, the polypropylene may be a homopolymer, and the polypropylene may be polymerized by using the hybrid supported catalyst, in which the first and second metallocene compounds having specific substituents and structures as described are supported to exhibit high catalytic activity, and may have remarkably improved melt strength by introducing long chain branches (LCB) into polypropylene molecules.

The terms used in this description are just for explaining exemplary embodiments and it is not intended to restrict the present invention.

The singular expression may include the plural expression unless it is differently expressed contextually.

It must be understood that the term "include", "equip", or "have" in the present description is only used for designating the existence of characteristics taken effect, numbers, steps, components, or combinations thereof, and do not exclude the existence or the possibility of addition of one or more different characteristics, numbers, steps, components or combinations thereof beforehand.

In the present specification, when a layer or an element is mentioned to be formed "on" or "above" layers or elements, it means that each layer or element is directly formed on the layers or elements, or other layers or elements may be formed between the layers, subjects, or substrates.

The present invention may be variously modified and have various forms, and specific exemplary embodiments will be illustrated and described in detail below. However, it is not intended to limit the present invention to the specific exemplary embodiments and it must be understood that the present invention includes every modifications, equivalents, or replacements included in the spirit and technical scope of the present invention.

Hereinafter, the present invention will be described in detail.

According to an aspect of the present invention, provided is a hybrid supported metallocene catalyst including one or more first metallocene compounds selected from compounds represented by the following Chemical Formula 1; one or more second metallocene compounds selected from compounds represented by the following Chemical Formula 2; and a carrier supporting the first and second metallocene compounds:

[Chemical Formula 1]

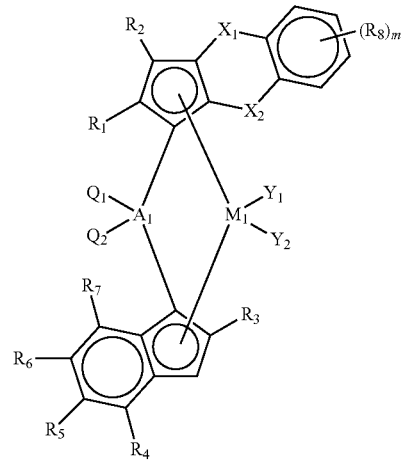

in Chemical Formula 1, $M_1$ is a Group 4 transition metal, $A_1$ is carbon (C), silicon (Si), or germanium (Ge), $Q_1$ and $Q_2$ are each independently $C_{1-20}$ alkyl, $R_1$ to $R_3$ are each independently $C_{1-20}$ alkyl, $R_4$ is $C_{6-20}$ aryl unsubstituted or substituted with $C_{1-20}$ alkyl, $R_5$ to $R_7$ are each independently any one of hydrogen, $C_{1-20}$ alkyl, $C_{2-20}$ alkenyl, $C_{6-30}$ aryl, $C_{7-30}$ alkylaryl, or $C_{7-30}$ arylalkyl, or two neighboring groups of the $R_5$ to $R_7$ are connected to each other to form an aliphatic ring group, $R_8$ is any one of hydrogen, $C_{1-20}$ alkyl, $C_{2-20}$ alkenyl, $C_{6-30}$ aryl, $C_{7-30}$ alkylaryl, or $C_{7-30}$ arylalkyl, $X_1$ and $X_2$ are each independently a single bond, or S or $CR_aR_b$, wherein at least one of $X_1$ or $X_2$ is S, and $R_a$ and $R_b$ are each independently any one of hydrogen, $C_{1-20}$ alkyl, $C_{2-20}$ alkenyl, $C_{6-30}$ aryl, $C_{7-30}$ alkylaryl, or $C_{7-30}$ arylalkyl, $Y_1$ and $Y_2$ are each independently halogen, and m is an integer of 1 to 4,

[Chemical Formula 2]

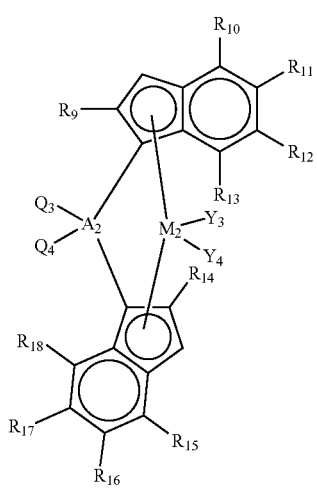

in Chemical Formula 2, $M_2$ is a Group 4 transition metal, $A_2$ is carbon (C), silicon (Si), or germanium (Ge), $Y_3$ and $Y_4$ are each independently halogen, $R_9$ and $R_{14}$ are each independently $C_{1-20}$ alkyl or $C_{6-20}$ aryl, $R_{10}$ and $R_{15}$ are each independently $C_{6-40}$ aryl unsubstituted or substituted with $C_{1-20}$ alkyl, $R_{11}$ to $R_{13}$ and $R_{16}$ to $R_{18}$ are each independently any one of hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-40}$ aryl, $C_{7-20}$ alkylaryl, or $C_{7-20}$ arylalkyl, and $Q_3$ and $Q_4$ are the same as each other, and are $C_{2-20}$ alkyl.

Unless otherwise specified herein, the following terms may be defined as follows.

The halogen may be fluorine (F), chlorine (Cl), bromine (Br), or iodine (I).

The alkyl having 1 to 20 carbons ($C_{1-20}$) may be a linear, branched, or cyclic alkyl. Specifically, the $C_{1-20}$ alkyl may be $C_{1-20}$ linear alkyl; $C_{1-15}$ linear alkyl; $C_{1-5}$ linear alkyl; $C_{3-20}$ branched or cyclic alkyl; $C_{3-15}$ branched or cyclic alkyl; or $C_{3-10}$ branched or cyclic alkyl. For example, the $C_{1-20}$ alkyl may be methyl, ethyl, propyl, isopropyl, n-butyl, tert-butyl, pentyl, hexyl, heptyl, octyl, cyclopropyl, cyclobutyl, cyclopentyl, cyclohexyl, cycloheptyl, cyclooctyl, and the like, but is not limited thereto.

The alkenyl having 2 to 20 carbons ($C_{2-20}$) may include linear or branched alkenyl, and specifically, may include allyl, ethenyl, propenyl, butenyl, pentenyl, and the like, but is not limited thereto.

The alkoxy having 1 to 20 carbons ($C_{1-20}$) may include methoxy, ethoxy, isopropoxy, n-butoxy, tert-butoxy, cyclohexyloxy, and the like, but is not limited thereto.

The alkoxyalkyl having 2 to 20 carbons ($C_{2-20}$) is a functional group, in which one or more hydrogens of the above-mentioned alkyl are substituted with alkoxy, and specifically, may include alkoxyalkyl such as methoxymethyl, methoxyethyl, ethoxymethyl, iso-propoxymethyl, iso-propoxyethyl, iso-propoxypropyl, iso-propoxyhexyl, tert-butoxymethyl, tert-butoxyethyl, tert-butoxypropyl, tert-butoxyhexyl, and the like, but is not limited thereto.

The aryloxy having 6 to 40 carbons ($C_{6-40}$) may include phenoxy, biphenoxyl, naphthoxy, and the like, but is not limited thereto.

The aryloxyalkyl having 7 to 40 carbons ($C_{7-40}$) is a functional group, in which one or more hydrogens of the above-mentioned alkyl are substituted with aryloxy, and specifically, may include phenoxymethyl, phenoxyethyl, phenoxyhexyl, and the like, but is not limited thereto.

The alkylsilyl having 1 to 20 carbons ($C_{1-20}$) or the alkoxysilyl having 1 to 20 carbons ($C_{1-20}$) is a functional group in which 1 to 3 hydrogens of —$SiH_3$ are substituted with 1 to 3 alkyl or alkoxy described above, and specifically, may include alkylsilyl such as methylsilyl, dimethylsilyl, trimethylsilyl, dimethylethylsilyl, diethylmethylsilyl, dimethylpropylsilyl, and the like; alkoxysilyl such as methoxysilyl, dimethoxysilyl, trimethoxysilyl, dimethoxyethoxysilyl, and the like; or alkoxyalkylsilyl such as methoxydimethylsilyl, diethoxymethylsilyl, dimethoxypropylsilyl, and the like, but is not limited thereto.

The silylalkyl having 1 to 20 carbons ($C_{1-20}$) is a functional group, in which one or more hydrogens of the above-mentioned alkyl are substituted with silyl, and specifically, may include —$CH_2$—$SiH_3$, methylsilylmethyl, dimethylethoxysilylpropyl, and the like, but is not limited thereto.

Further, the alkylene having 1 to 20 carbons ($C_{1-20}$) is the same as the above-mentioned alkyl, except that it is a divalent substituent, and specifically, may include methylene, ethylene, propylene, butylene, pentylene, hexylene, heptylene, octylene, cyclopropylene, cyclobutylene, cyclopentylene, cyclohexylene, cycloheptylene, cyclooctylene, and the like, but is not limited thereto.

The aryl having 6 to 20 carbons ($C_{6-20}$) may be a monocyclic, bicyclic, or tricyclic aromatic hydrocarbon. For example, the aryl having 6 to 20 carbons ($C_{6-20}$) may include phenyl, biphenyl, naphthyl, anthracenyl, phenanthrenyl, fluorenyl, and the like, but is not limited thereto.

The alkylaryl having 7 to 20 carbons ($C_{7-20}$) may refer to a substituent in which one or more hydrogens of the aromatic ring are substituted with the above-mentioned alkyl. For example, the alkylaryl having 7 to 20 carbons ($C_{7-20}$) may include methylphenyl, ethylphenyl, methylbiphenyl, methylnaphthyl, and the like, but is not limited thereto.

The arylalkyl having 7 to 20 carbons ($C_{7-20}$) may refer to a substituent in which one or more hydrogens of the alkyl are substituted with the above-mentioned alkyl. For example, the arylalkyl having 7 to 20 carbons ($C_{7-20}$) may include phenylmethyl, phenylethyl, biphenylmethyl, naphthylmethyl, and the like, but is not limited thereto.

In addition, the arylene having 6 to 20 carbons ($C_{6-20}$) is the same as the above-mentioned aryl, except that it is a divalent substituent, and specifically, may include phenylene, biphenylene, naphthylene, anthracenylene, phenanthrenylene, fluorenylene, and the like, but is not limited thereto.

The Group 4 transition metal may be titanium (Ti), zirconium (Zr), hafnium (Hf), or rutherfordium (Rf), specifically, titanium (Ti), zirconium (Zr), or hafnium (Hf), and more specifically, zirconium (Zr), or hafnium (Hf), but is not limited thereto.

Further, the Group 13 element may be boron (B), aluminum (Al), gallium (Ga), indium (In), or thallium (Tl), and specifically, boron (B) or aluminum (Al), but is not limited thereto.

The above-mentioned substituents may be optionally substituted with one or more substituents selected from the group consisting of a hydroxy group; halogen; alkyl or alkenyl, aryl, alkoxy; alkyl or alkenyl, aryl, alkoxy containing one or more heteroatoms of Groups 14 to 16 heteroatoms; silyl; alkylsilyl or alkoxysilyl; a phosphine group; a phosphide group; a sulfonate group; and a sulfone group within a range to exert the same or similar effect as the desired effect.

Meanwhile, the hybrid supported catalyst of the present invention, in which the first metallocene compound forming a double bond at the end and the second metallocene compound having high molecular weight properties during propylene polymerization are hybrid-supported, exhibits high activity in propylene polymerization, and is usefully applied to the preparation of polypropylenes with high melt strength by introducing long chain branches (LCB) into the polypropylene molecules.

Specifically, the first metallocene compound of Chemical Formula 1 includes S having unshared pairs of electrons in the ligand structure, and thus more abundant electrons may be provided for metal atoms, thereby stabilizing vacant sites of the transition metal included in a bridge group. Accordingly, it is possible to induce beta-hydride elimination of the polymer chain to form a macromer having a double bond at the end, and in particular, a vinyl end group that may serve as a monomer may be included in a high ratio, thereby introducing long chain branches (LCB) into the polypropylene molecule.

In general, a polymer having a terminal group (or end group) saturated with hydrogen is produced upon chain termination in the presence of hydrogen. Production of a polymer having a double bond as a terminal group may be caused by structural characteristics of a catalyst.

The production of a polymer having a double bond at the end is performed according to two mechanisms: beta-hydrogen-elimination or beta-methyl-extraction, as shown in Reaction Scheme 1 below.

[Reaction Scheme 1]

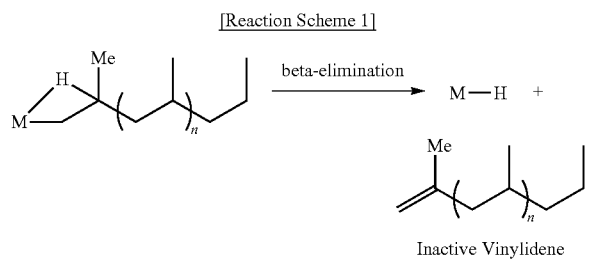

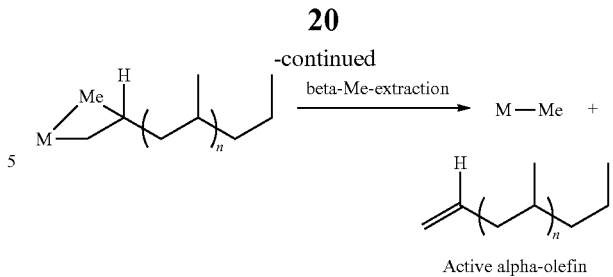

In Reaction Scheme 1, M is a metal element, H is a hydrogen atom, and Me is methyl.

In general, beta-hydrogen elimination (β-hydrogen-elimination) occurs more easily, but a vinylidene end group produced at this time is replaced by a substituent to lose its role as a monomer, and thus it is inactive as a macromonomer. In contrast, the vinyl end group generated by the beta-methyl elimination is active, and may serve as a monomer.

In particular, the first metallocene compound of Chemical Formula 1 includes S having unshared pairs of electrons in the ligand structure, thereby providing more abundant electrons for metal atoms. Accordingly, even when the metal atoms have vacant sites, they may maintain stability, and thus a vinyl end group may be generated.

In contrast, with regard to general transition metal compounds, when a metal atom has a vacant site, it forms a metal-hydrogen bond (Metal-H bond) to become stable, and thus an inactive vinylidene end group is generated. Accordingly, when the transition metal compound according to the present invention is used as a catalyst for the polymer preparation, it is possible to generate a polymer having a high proportion of vinyl end group and a low proportion of vinylidene end group.

In addition, since the first metallocene compound of Chemical Formula 1 includes two ligand structures having different asymmetric structures, it may have various characteristics of the two different ligands or may selectively take advantages thereof, and as a result, it may exhibit superior catalytic activity.

Of the two ligands in the first metallocene compound of Chemical Formula 1, in a first ligand including a cyclopentadienyl group, in which S is included and two ring structures are fused, $C_{1-20}$ alkyl($R_1$ and $R_2$) is substituted at the 2 and 3-positions, respectively, and in a second ligand having an indene structure or a structure, in which an aliphatic ring is further fused to the benzene ring of the indene, $C_{1-20}$ alkyl($R_3$) is substituted at the 2-position, and $C_{6-20}$ aryl($R_4$) unsubstituted or substituted with $C_{1-20}$ alkyl is substituted at the 4-position, respectively. Therefore, superior catalytic activity may be achieved due to an induction effect of providing sufficient electrons, and when the first metallocene compound is used as a catalyst for polypropylene polymerization, tacticity of the molecular structure of polypropylene may be easily controlled to lower a melting point. In particular, $R_4$ substituted at the 4-position of the second ligand includes an aryl group to increase aromaticity of the first metallocene compound, thereby further improving the catalytic activity.

Further, the first metallocene compound includes a functional group $A_1$ disubstituted with $C_{1-20}$ alkyl ($Q_1$ and $Q_2$) as a bridge group connecting the two ligands to each other. Thus, the atomic size increases and the available angle increases, and accordingly, monomers may be easily accessible, thereby achieving superior catalytic activity. In addition, $Q_1$ and $Q_2$ which are substituents of $A_1$ may increase solubility of the transition metal compound to improve the supporting efficiency during preparation of the supported catalyst.

Meanwhile, the second metallocene compound represented by Chemical Formula includes a divalent functional group $A_2$ disubstituted with the same alkyl groups having two or more carbons as a bridge group connecting the two indenyl ligands to each other. Thus, its atomic size increases, as compared with existing carbon bridges, and the available angle increases, and accordingly, monomers may be easily accessible, thereby achieving superior catalytic activity. In particular, since the second metallocene compound represented by Chemical Formula 2 has superior tacticity to the first metallocene compound represented by Chemical Formula 1, it is suitable for propylene polymerization and has superior catalytic activity, and thus plays a role in polymerizing a polymer chain having a high molecular weight.

Therefore, the hybrid supported metallocene catalyst further includes the second metallocene compound, in addition to the first metallocene compound, that is, the hybrid supported metallocene catalyst includes two or more different kinds of metallocene compounds, thereby exhibiting high activity in the propylene polymerization and preparing a polypropylene having excellent physical properties, in particular, improved melt strength by introducing long chain branches (LCB) into the polypropylene molecules.

Specifically, in Chemical Formula 1, $Q_1$ and $Q_2$ may be the same as or different from each other, and may be each $C_{1-6}$ or $C_{1-5}$ alkyl, and specifically, methyl, ethyl, or n-hexyl.

Further, in Chemical Formula 1, $Y_1$ and $Y_2$ may be each halogen, and specifically, chlorine.

Further, in Chemical Formula 1, $A_1$ may be silicon (Si).

Further, in Chemical Formula 1, $M_1$ may be zirconium (Zr) or hafnium (Hf), and specifically, zirconium (Zr). Since Zr has more electron-accepting orbitals than other Group 4 transition metals such as Hf, and the like, it may easily bind to monomers with higher affinity, thereby achieving superior catalytic activity. In addition, Zr may improve storage stability of a metal complex.

Further, in Chemical Formula 1, $R_1$ to $R_3$ may be each independently $C_{1-20}$, or $C_{1-12}$, or $C_{1-6}$ linear or branched alkyl, and more specifically, $C_{1-6}$ or $C_{1-4}$ linear alkyl such as methyl, ethyl, propyl, or n-butyl. More specifically, $R_1$ to $R_3$ may be each methyl.

Further, in Chemical Formula 1, $R_4$ may be $C_{6-12}$ aryl unsubstituted or substituted with $C_{1-8}$ linear or branched alkyl, and more specifically, phenyl or naphthyl unsubstituted or substituted with $C_{3-6}$ branched alkyl. When substituted with alkyl, the aryl may be substituted with one or more alkyls, more specifically, one alkyl or two alkyls. Specific examples of $R_4$ may include phenyl, 4-(tert-butyl) phenyl, 3,5-di-(tert-butyl)phenyl, naphthyl, and the like. Further, when $R_4$ is phenyl substituted with $C_{3-6}$ branched alkyl, the substitution position of the $C_{3-6}$ branched alkyl group to the phenyl group may be the 4-position corresponding to a para position or 3- or 5-position corresponding a meta position with respect to the $R_4$ position bound to the indenyl group.

Further, in Chemical Formula 1, $R_5$ to $R_7$ may be each independently any one of hydrogen, $C_{1-12}$ alkyl, $C_{2-12}$ alkenyl, $C_{6-18}$ aryl, $C_{7-20}$ alkylaryl, or $C_{7-20}$ arylalkyl, or two neighboring functional groups, for example, $R_5$ and $R_6$, or $R_6$ and $R_7$ are connected to each other to form a $C_{3-12}$, or $C_{4-8}$, or $C_{5-6}$ aliphatic ring group (or aliphatic ring structure) such as cyclopentyl.

Further, in Chemical Formula 1, $R_8$ may be any one of hydrogen, $C_{1-12}$ alkyl, $C_{2-12}$ alkenyl, $C_{6-12}$ aryl, $C_{7-15}$ alkylaryl, or $C_{7-15}$ arylalkyl. More specifically, $R_8$ may be any one of hydrogen or $C_{1-6}$ linear or branched alkyl. Specific examples of $R_8$ may be hydrogen, methyl, ethyl, propyl, n-butyl, or t-butyl, and the like. Preferably, $R_8$ may be hydrogen.

Further, in Chemical Formula 1, $X_1$ and $X_2$ may be each independently a single bond, S or $CR_aR_b$, wherein any one of $X_1$ or $X_2$ may be S, and more specifically, any one of $X_1$ or $X_2$ may be S, and the other may be a single bond. For example, $X_1$ may be S and $X_2$ may be a single bond, or $X_1$ may be a single bond and $X_2$ may be S. In addition, when $X_1$ or $X_2$ is $CR_aR_b$, $R_a$ and $R_b$ may be, more specifically, each independently, any one of hydrogen, $C_{1-10}$ alkyl, $C_{2-10}$ alkenyl, $C_{6-12}$ aryl, $C_{7-13}$ alkylaryl, or $C_{7-13}$ arylalkyl.

Further, in Chemical Formula 1, $Q_1$ and $Q_2$ may be each independently $C_{1-6}$ or $C_{1-5}$ linear alkyl, and more specifically, methyl, ethyl, or n-hexyl, $R_1$ to $R_3$ may be each independently $C_{1-6}$ or $C_{1-4}$ linear alkyl, and more specifically, all of $R_1$ to $R_3$ may be methyl, $R_4$ may be phenyl or naphthyl unsubstituted or substituted with $C_{3-6}$ branched alkyl, and more specifically, phenyl, 4-tbutylphenyl, 3,5-di-tbutylphenyl, or naphthyl, $R_5$ to $R_7$ may be each independently hydrogen, or two neighboring groups of $R_5$ to $R_7$ are connected to each other to form a cyclopentyl group, and any one of $X_1$ or $X_2$ may be S, and the other may be a single bond.

Further, in Chemical Formula 1, $A_1$ may be silicon, $M_1$ may be zirconium, $Q_1$ and $Q_2$ may be each independently $C_{1-6}$ or $C_{1-5}$ linear alkyl, and more specifically, methyl, ethyl, or n-hexyl, $R_1$ to $R_3$ may be each independently $C_{1-6}$ or $C_{1-4}$ linear alkyl, and more specifically, all of $R_1$ to $R_3$ may be methyl, $R_4$ may be phenyl or naphthyl unsubstituted or substituted with $C_{3-6}$ branched alkyl, and more specifically, phenyl, 4-tbutylphenyl, 3,5-di-tbutylphenyl, or naphthyl, $R_5$ to $R_7$ may be each independently hydrogen, or two neighboring groups of $R_5$ to $R_7$ are connected to each other to form a cyclopentyl group, and any one of $X_1$ or $X_2$ may be S, and the other may be a single bond. In this regard, $R_8$ may be hydrogen.

Further, the first metallocene compound represented by Chemical Formula 1 may be represented by any one of the following structural formulae:

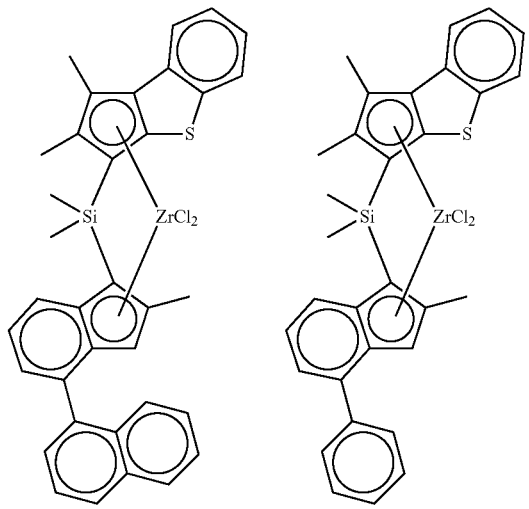

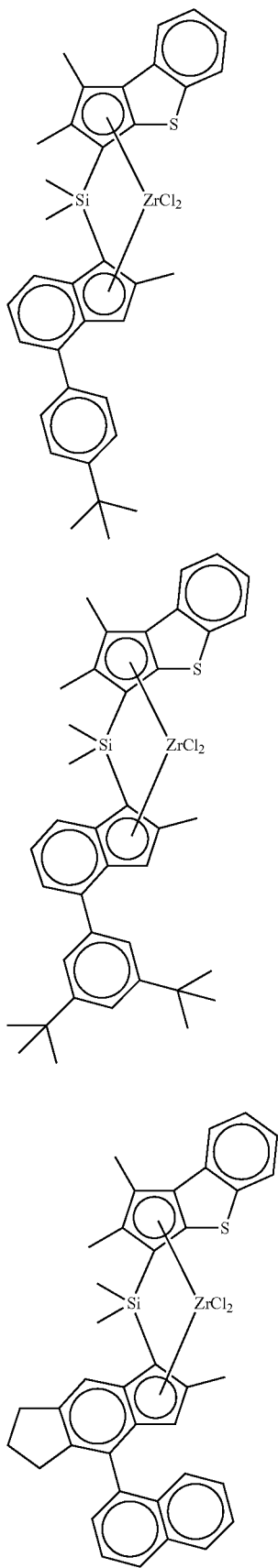
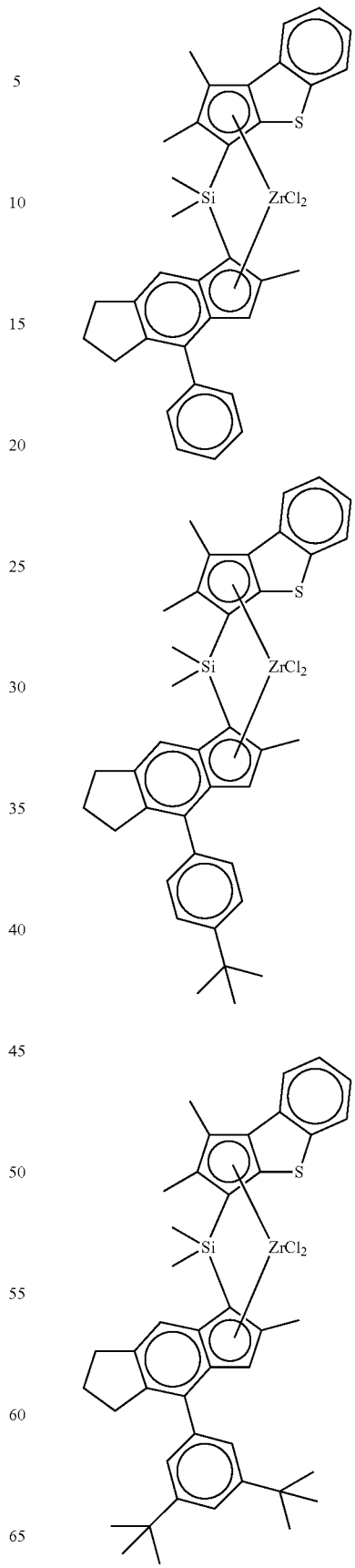

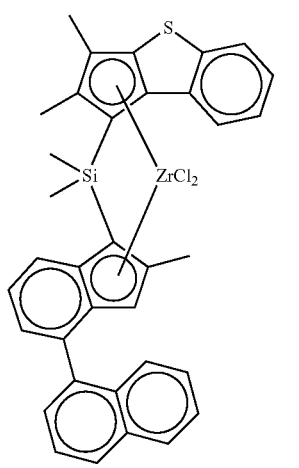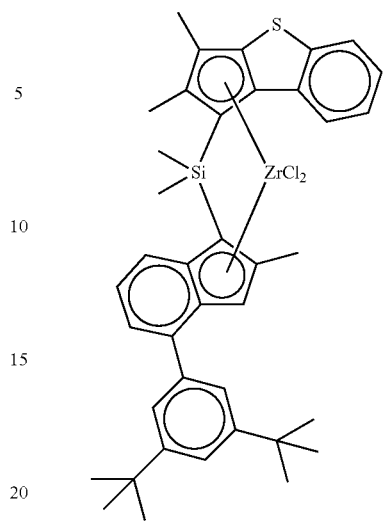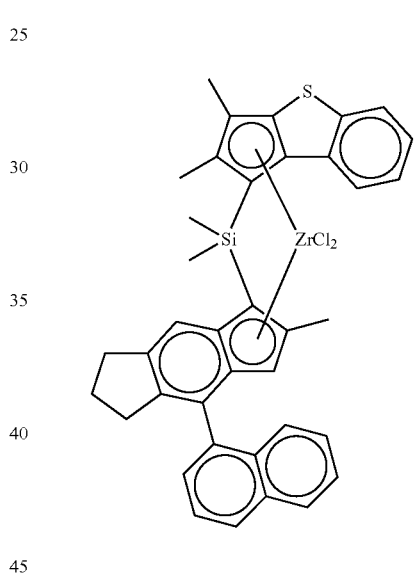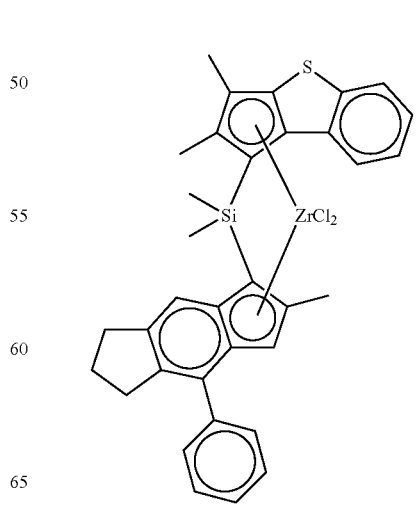

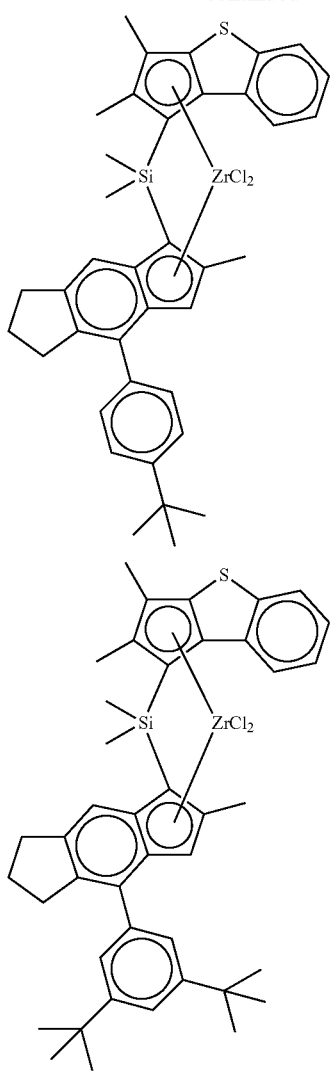
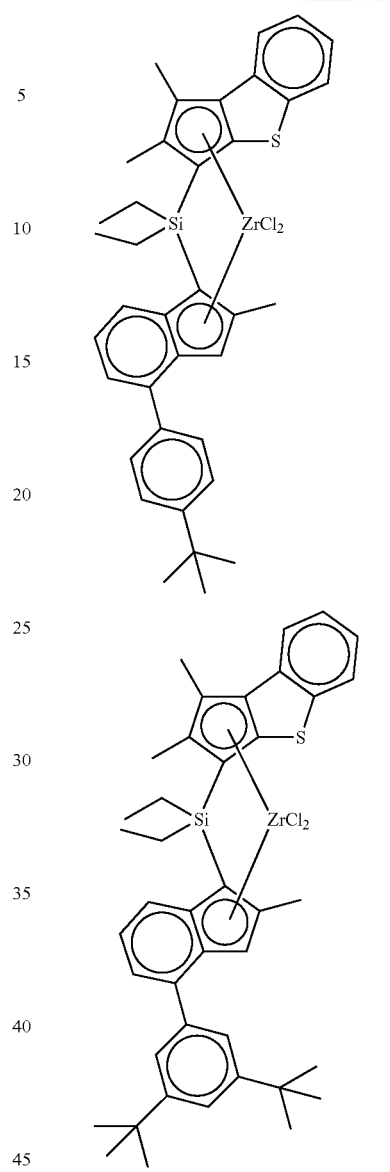
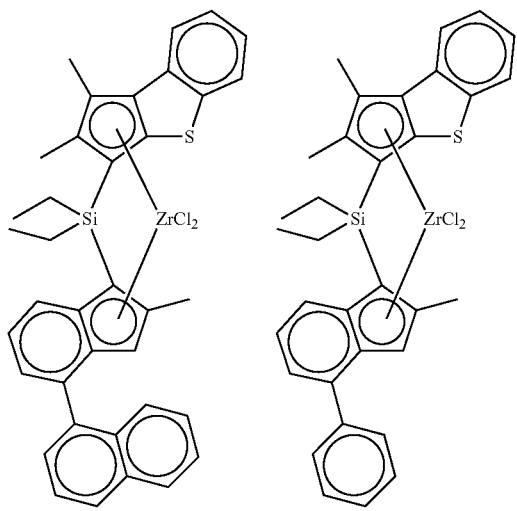
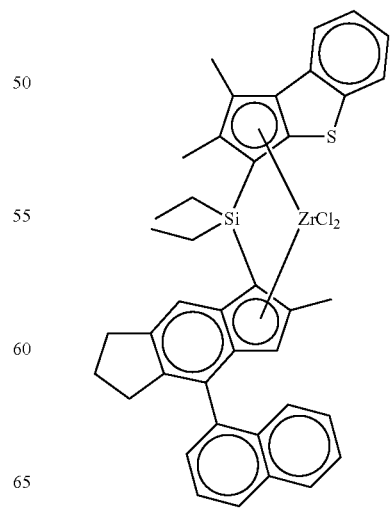

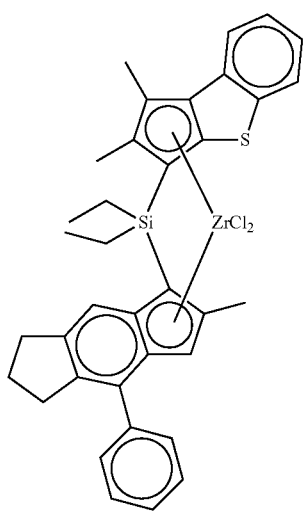
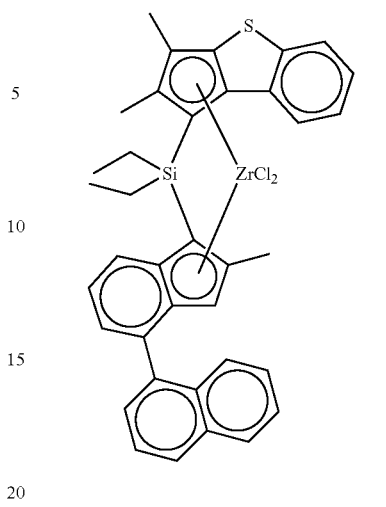
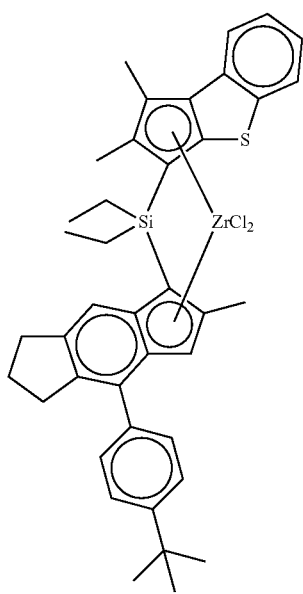
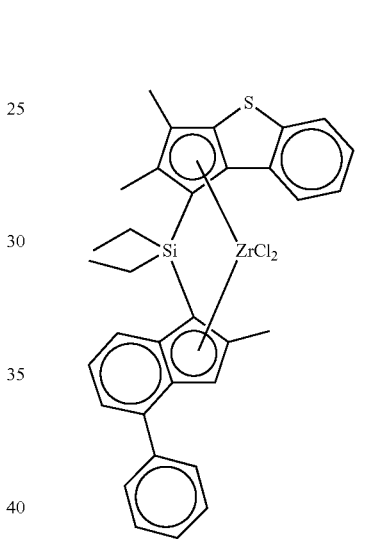
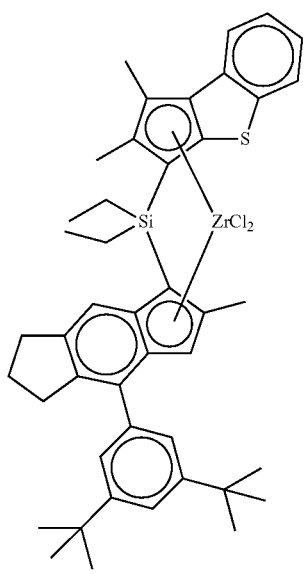
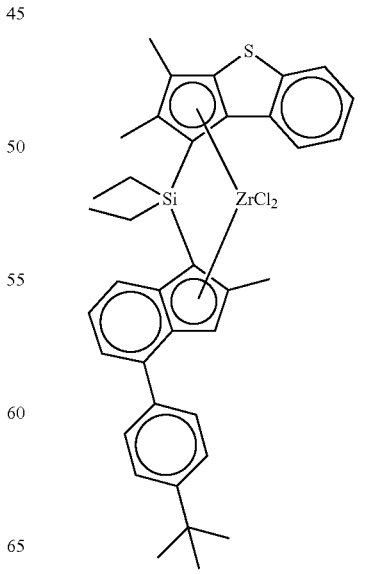

31
-continued
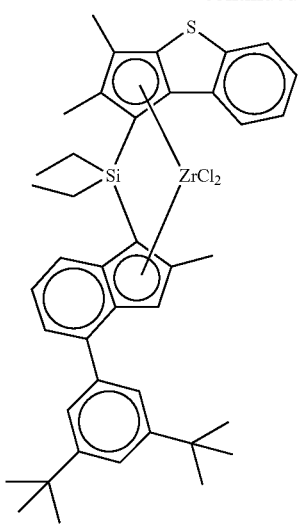
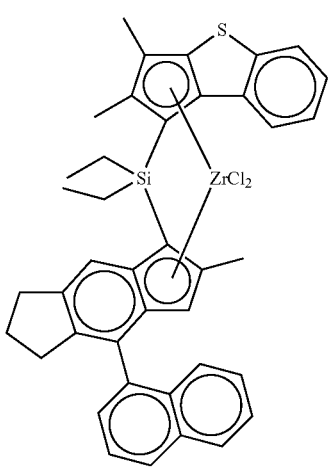
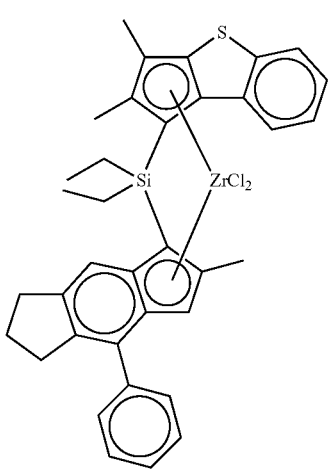
32
-continued
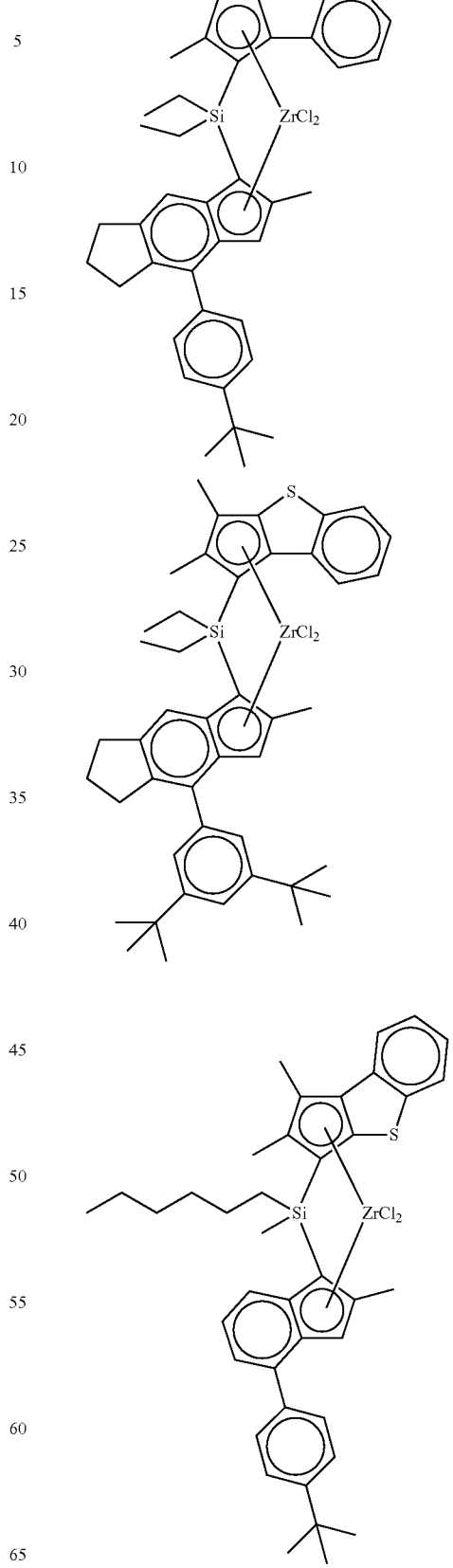

Meanwhile, the hybrid supported metallocene catalyst of the present invention may further include the second metallocene compound, in addition to the above-described first metallocene compound.

Specifically, in Chemical Formula 2, $Y_3$ and $Y_4$ may be each halogen, and specifically, chlorine.

Further, in Chemical Formula 2, $A_2$ may be silicon (Si).

Further, in Chemical Formula 2, $M_2$ may be zirconium (Zr) or hafnium (Hf), and specifically zirconium (Zr). Since Zr has more electron-accepting orbitals than other Group 4 transition metals such as Hf, and the like, it may easily bind to monomers with higher affinity, thereby achieving superior catalytic activity. In addition, Zr may improve storage stability of a metal complex.

Further, in Chemical Formula 2, $R_9$ and $R_{14}$ may be each independently $C_{1-20}$, or $C_{1-6}$, or $C_{1-4}$ linear or branched alkyl or $C_{6-20}$ or $C_{6-12}$ aryl, and more specifically, $C_{1-6}$ or $C_{1-4}$ linear or branched alkyl such as methyl, ethyl, or i-propyl. More specifically, $R_9$ and $R_{14}$ may be each methyl.

Further, in Chemical Formula 2, $R_{11}$ to $R_{13}$ and $R_{16}$ to $R_{18}$ may be each independently hydrogen, methyl, ethyl, propyl, isopropyl, n-butyl, tert-butyl, pentyl, hexyl, heptyl, octyl, trimethylsilylmethyl, or two or more neighboring groups of $R_{11}$ to $R_{13}$ or $R_{16}$ to $R_{18}$ are connected to each other to form an aromatic ring unsubstituted or substituted with methyl or phenyl, but is not limited thereto.

Further, in Chemical Formula 2, $R_{10}$ and $R_{15}$ may be each $C_{6-12}$ aryl unsubstituted or substituted with $C_{1-8}$ linear or branched alkyl, and more specifically, phenyl or naphthyl unsubstituted or substituted with $C_{3-6}$ branched alkyl. Specific examples of $R_{10}$ and $R_{15}$ may include phenyl substituted with $C_{3-6}$ branched alkyl, and preferably, tert-butylphenyl. Further, when $R_{10}$ and $R_{15}$ are phenyl substituted with $C_{3-6}$ branched alkyl, the substitution position of the $C_{3-6}$ branched alkyl group to the phenyl group may be the 4-position corresponding to a para position with respect to $R_{10}$ and $R_{15}$ positions bound to an indenyl group.

Further, in Chemical Formula 2, $Q_3$ and $Q_4$ may be the same as each other, and may be $C_{2-4}$ linear alkyl, and preferably, ethyl.

Further, in Chemical Formula 2, $Q_3$ and $Q_4$ may be the same as each other, and may be $C_{2-4}$ linear alkyl, and more specifically, $Q_3$ and $Q_4$ may be ethyl, $R_9$ and $R_{14}$ may be each independently $C_{1-6}$ or $C_{1-3}$ linear or branched alkyl, and more specifically, all of $R_9$ and $R_{14}$ may be methyl, $R_{10}$ and $R_{15}$ may be phenyl substituted with $C_{3-6}$ branched alkyl, and more specifically, 4-t-butylphenyl, $R_{11}$ to $R_{13}$ and $R_{16}$ to $R_{18}$ may be each independently hydrogen or $C_{1-3}$ linear or branched alkyl, and more specifically, $R_{11}$ to $R_{13}$ and $R_{16}$ to $R_{18}$ may be hydrogen.

Further, in Chemical Formula 2, $A_2$ may be silicon, $M_2$ may be zirconium, $Q_3$ and $Q_4$ may be the same as each other, and may be $C_{2-4}$ linear alkyl, and more specifically, $Q_3$ and $Q_4$ may be ethyl, $R_9$ and $R_{14}$ may be each independently $C_{1-6}$ or $C_{1-3}$ linear or branched alkyl, and more specifically, all of $R_9$ and $R_{14}$ may be methyl, $R_{10}$ and $R_{15}$ may be phenyl substituted with $C_{3-6}$ branched alkyl, and more specifically, 4-t-butylphenyl, $R_{11}$ to $R_{13}$ and $R_{16}$ to $R_{18}$ may be each independently hydrogen or $C_{1-3}$ linear or branched alkyl, and more specifically, $R_{11}$ to $R_{13}$ and $R_{16}$ to $R_{18}$ may be hydrogen.

Further, in Chemical Formula 2, the second metallocene compound may include a compound represented by the following structural formula, but is not limited thereto:

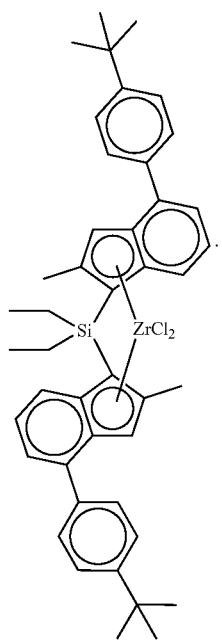

Meanwhile, in the present invention, the first metallocene compound and the second metallocene compound may be each a mesoisomer, a racemic isomer, or a mixture thereof.

As used herein, the "racemic form", "racemate", or "racemic isomer" means that the same substituents on the two cyclopentadienyl moieties exist on the opposite side with respect to the plane containing the transition metal represented by $M_1$ or $M_2$ in Chemical Formula 1 or Chemical Formula 2, e.g., zirconium (Zr) or hafnium (Hf), and the center of the cyclopentadienyl moieties.

As used herein, the term "meso form" or "meso isomer", which is a stereoisomer of a racemic form, means that the same substituents on the two cyclopentadienyl moieties exist on the same side with respect to the plane containing the transition metal represented by $M_1$ or $M_2$ in Chemical Formula 1 or Chemical Formula 2, e.g., zirconium (Zr) or hafnium (Hf), and the center of the cyclopentadienyl moieties.

In the hybrid supported metallocene catalyst of the present invention, the first metallocene compound and the second metallocene compound may be supported at a molar ratio of about 1:1 to about 1:8. When the supporting ratio is less than about 1:1, only the first metallocene compound plays a leading role, and thus tacticity is significantly lowered during propylene polymerization, and the catalyst becomes highly sticky, which may make it difficult to form the polymer itself. Further, when the supporting ratio is higher than about 1:8, only the second metallocene compound plays a leading role, and the content of long chain branches (LCB) in the polypropylene molecule is lowered, which may lower melt strength.

Specifically, the hybrid supported metallocene catalyst, in which the first metallocene compound and the second metallocene compound are supported at a molar ratio of about 1:1 to about 1:6 or at a molar ratio of about 1:1 to about 1:5, may introduce long chain branches (LCB) in the polypropylene molecule while exhibiting high activity in propylene polymerization, thereby preferably preparing a polypropylene with excellent physical properties, in particular, improved melt strength.

In other words, the hybrid supported metallocene catalyst of the present invention, in which the first metallocene compound and the second metallocene compound are supported at the above molar ratio, may further improve melt strength of polypropylene due to interaction between two or more kinds of catalysts.

In the hybrid supported metallocene catalyst of the present invention, a carrier including a hydroxy group on the surface thereof may be used as the carrier for supporting the first metallocene compound and the second metallocene compound, and preferably, the carrier may be a carrier including a highly reactive hydroxyl group or siloxane group, of which the surface is dried and removed of moisture.

For example, silica, silica-alumina, and silica-magnesia dried at a high temperature may be used. These carriers may usually include oxide, carbonate, sulfate, and nitrate components such as $Na_2O$, $K_2CO_3$, $BaSO_4$, $Mg(NO_3)_2$, and the like.

A temperature, at which the carrier is dried, may be preferably about 200° C. to about 800° C., and more preferably, about 300° C. to about 600° C., and most preferably, about 300° C. to about 400° C. When the temperature, at which the carrier is dried, is lower than 200° C., moisture is excessive so that the moisture on the surface may react with a cocatalyst described below, and when the temperature is higher than 800° C., pores on the carrier surface are combined to decrease a surface area, and many hydroxy groups on the surface are lost so that only siloxane groups are left. Thus, reactive sites with the cocatalyst may be reduced, which is not preferable.

An amount of the hydroxy group on the carrier surface may be preferably about 0.1 mmol/g to about 10 mmol/g, and more preferably about 0.5 mmol/g to about 5 mmol/g. The amount of the hydroxy group on the carrier surface may be adjusted by the preparation method and preparation conditions or drying conditions of the carrier, for example, temperature, time, vacuum or spray drying, and the like.

When the amount of the hydroxy group is smaller than about 0.1 mmol/g, the number of reaction sites with the cocatalyst is small, and when the amount is larger than about 10 mmol/g, the hydroxy group may result from the moisture other than the hydroxy group present on the surface of carrier particles, which is not preferable.

Further, in the hybrid supported metallocene catalyst, one or more first metallocene compounds and one or more second metallocene compounds are supported together with a cocatalyst compound on the carrier. The cocatalyst may be any cocatalyst, as long as it is a cocatalyst used for olefin polymerization in the presence of the common metallocene catalyst. Such a cocatalyst allows formation of a bond between the hydroxy groups on the carrier and the Group 13 transition metal. Further, since the cocatalyst exists only the surface of the carrier, it may contribute to obtaining intrinsic characteristics of the specific hybrid catalyst composition of the present invention without a fouling phenomenon, in which polymer particles stick to the wall surface of a reactor or stick to each other.

Specifically, the hybrid supported metallocene catalyst may further include one or more cocatalysts selected from the group consisting of compounds represented by the following Chemical Formulae 3 to 5:

—[Al(R$_{31}$)—O]$_c$—      [Chemical Formula 3]

in Chemical Formula 3,

R$_{31}$ is each independently halogen, C$_{1-20}$ alkyl, or C$_{1-20}$ haloalkyl, and c is an integer of 2 or more, D(R$_{41}$)$_3$      [Chemical Formula 4]

in Chemical Formula 4,

D is aluminum or boron, and

R$_{41}$ is each independently hydrogen, halogen, C$_{1-20}$ hydrocarbyl or halogen-substituted C$_{1-20}$ hydrocarbyl,

[L-H]$^+$[Q(E)$_4$]$^-$ or [L]$^+$[Q(E)$_4$]-      [Chemical Formula 5]

in Chemical Formula 5,

L is a neutral or cationic Lewis base,

[L-H]$^+$ is a Bronsted acid,

Q is B$^{3+}$ or Al$^{3+}$, and

E is each independently C$_{6-40}$ aryl or C$_{1-20}$ alkyl, wherein C$_{6-40}$ aryl or C$_{1-20}$ alkyl is unsubstituted or substituted with one or more substituents selected from the group consisting of halogen, C$_{1-20}$ alkyl, C$_{1-20}$ alkoxy, and phenoxy.

The compound represented by Chemical Formula 3 may be, for example, alkylaluminoxane, such as modified methyl aluminoxane (MMAO), methyl aluminoxane (MAO), ethylaluminoxane, isobutylaluminoxane, butylaluminoxane, and the like.

The alkyl metal compound represented by Chemical Formula 4 may be, for example, trimethylaluminum, triethylaluminum, triisobutylaluminum, tripropylaluminum, tributylaluminum, dimethylchloroaluminum, dimethylisobutylaluminum, dimethylethylaluminum, diethylchloroaluminum, triisopropylaluminum, tri-s-butylaluminum, tricyclopentylaluminum, tripentylaluminum, triisopentylaluminum, trihexylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and the like.

The compound represented by Chemical Formula 5 may be, for example, triethylammonium tetraphenylboron, tributylammonium tetraphenylboron, trimethylammonium tetraphenylboron, tripropylammonium tetraphenylboron, trimethylammonium tetra(p-tolyl)boron, tripropylammonium tetra(p-tolyl)boron, triethylammonium tetra(o,p-dimethylphenyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylanilinium tetraphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl)aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl)aluminum, tributylammonium tetrapentafluorophenylaluminum, N,N-diethylanilinium tetraphenylaluminum, N,N-diethylanilinium tetrapentafluorophenylaluminum, diethylammonium tetrapentafluorophenylaluminum, triphenylphosphonium tetraphenylaluminum, trimethylphosphonium tetraphenylaluminum, triphenylcarbonium tetraphenylboron, triphenylcarbonium tetraphenylaluminum, triphenylcarbonium tetra(p-trifluoromethylphenyl)boron, triphenylcarbonium tetrapentafluorophenylboron, and the like.

In addition, the hybrid supported metallocene catalyst may include the cocatalyst and the first metallocene compound at a molar ratio of about 1:1 to about 1:10000, preferably, at a molar ratio of about 1:1 to about 1:1000, and more preferably, at a molar ratio of about 1:10 to about 1:100.

In addition, the hybrid supported metallocene catalyst may include the cocatalyst and the second metallocene compound at a molar ratio of about 1:1 to about 1:10000, preferably, at a molar ratio of about 1:1 to about 1:1000, and more preferably, at a molar ratio of about 1:10 to about 1:100.

In this regard, when the molar ratio is less than 1, the metal content in the cocatalyst is too low, and thus the catalytic active species is not well formed, and the activity may be lowered. When the molar ratio is more than about 10000, it is apprehended that the metal of the cocatalyst may rather act as a catalyst poison.

The supporting amount of the cocatalyst may be about 5 mmol to about 20 mmol, based on 1 g of the carrier.

Meanwhile, the hybrid supported metallocene catalyst may be prepared by a preparation method including the steps of supporting the cocatalyst on the carrier; supporting the first metallocene compound on the cocatalyst-supported carrier; and supporting the second metallocene compound on the cocatalyst- and the first metallocene compound-supported carrier.

Alternatively, the hybrid supported metallocene catalyst may be prepared by a preparation method including the steps of supporting the cocatalyst on the carrier; supporting the second metallocene compound on the cocatalyst-supported carrier; and supporting the first metallocene compound on the cocatalyst- and the second metallocene compound-supported carrier.

Alternatively, the hybrid supported metallocene catalyst may be prepared by a preparation method including the steps of supporting the first metallocene compound on the carrier; supporting the cocatalyst on the first metallocene compound-supported carrier; and supporting the second metallocene compound on the cocatalyst- and the first metallocene compound-supported carrier.

In the above method, the supporting conditions are not particularly limited, and the supporting may be performed within a range well known to those skilled in the art. For example, the supporting may be appropriately performed at a high temperature and at a low temperature. For example, the supporting temperature may be in the range of about −30° C. to 150° C., and may be preferably about 50° C. to about 98° C., or about 55° C. to about 95° C. The supporting time may be appropriately controlled depending on the amount of the first metallocene compound to be supported. The reacted supported catalyst may be used as it is, after the reaction solvent is removed through filtration or distillation under reduced pressure, or subjected to Soxhlet filtering using aromatic hydrocarbon such as toluene, if necessary.

The preparation of the supported catalyst may be carried out in the presence of a solvent or without a solvent. When the solvent is used, it may include aliphatic hydrocarbon solvents such as hexane or pentane, aromatic hydrocarbon solvents such as toluene or benzene, chlorinated hydrocarbon solvents such as dichloromethane, ether solvents such as diethylether or tetrahydrofuran (THF), and common organic solvents such as acetone or ethylacetate. Preferred are hexane, heptane, toluene and dichloromethane.

In the present invention, in the method of preparing the metallocene compound or the supported catalyst, equivalent (eq) means a molar equivalent (eq/mol).

Meanwhile, the present invention provides a method of preparing a polypropylene, the method including the step of polymerizing propylene monomers in the presence of the hybrid supported metallocene catalyst.

The polymerization reaction may be performed by homopolymerizing propylene using a single continuous slurry polymerization reactor, loop slurry reactor, gas phase reactor, or solution reactor.

Further, the polymerization temperature may be about 25° C. to about 500° C., or about 25° C. to about 300° C., or about 30° C. to about 200° C., or about 50° C. to about 150° C., or about 60° C. to about 120° C. Further, the polymerization pressure may be about 1 kgf/cm$^2$ to about 100 kgf/cm$^2$, or about 1 kgf/cm$^2$ to about 50 kgf/cm$^2$, or about 5 kgf/cm$^2$ to about 45 kgf/cm$^2$, or about 10 kgf/cm$^2$ to about 40 kgf/cm$^2$, or about 15 kgf/cm$^2$ to about 35 kgf/cm$^2$.

The supported metallocene catalyst may be injected after being dissolved or diluted in a $C_5$ to $C_{12}$ aliphatic hydrocarbon solvent such as pentane, hexane, heptane, nonane, decane and an isomer thereof, in an aromatic hydrocarbon solvent such as toluene and benzene, or in a chlorinated hydrocarbon solvent such as dichloromethane and chlorobenzene. The solvent used herein is preferably used after removing a small amount of water or air, which acts as a catalyst poison, by treating with a small amount of alkyl aluminum. It is also possible to further use the cocatalyst.

In particular, the hybrid supported metallocene catalyst according to the present invention exhibits high activity in the propylene polymerization, and is usefully applied to the preparation of polypropylenes with excellent physical properties, in particular, improved melt strength by introducing long chain branches (LCB) into the polypropylene molecules. Specifically, since the catalyst precursor of Chemical Formula 2 exhibiting high molecular weight properties during propylene polymerization is used together with the catalyst precursor of Chemical Formula 1 for the synthesis of a macromer having a double bond at the end, the hybrid supported metallocene catalyst of the present invention is advantageous in achieving high melt strength by introducing long chain branches (LCB) into the polypropylene molecule.

For example, the step of polymerizing may be performed by injecting about 1500 ppm or less, or about 200 ppm to about 1500 ppm, about 1000 ppm or less, or about 250 ppm to about 1000 ppm, or about 850 ppm or less, or about 300 ppm to about 850 ppm of hydrogen gas, based on the content of propylene monomer.

In such a propylene polymerization process, the transition metal compound of the present invention may exhibit high catalytic activity. For example, during propylene polymerization, the catalytic activity may be about 7.8 kg PP/g·cat·hr or more, or about 7.8 kg PP/g·cat·hr to about 50 kg PP/g·cat·hr, specifically 8.5 kg PP/g·cat·hr or more, or about 8.5 kg PP/g·cat·hr to about 40 kg PP/g·cat·hr, specifically, 9.5 kg PP/g·cat·hr or more, or about 9.5 kg PP/g·cat·hr to about 35 kg PP/g·cat·hr, as calculated as a ratio of the weight (kg PP) of the produced polypropylene to the weight (g) of the used supported catalyst, based on unit time (h).

The step of polymerizing may be a step of homopolymerizing propylene monomers alone.

In the present invention, when the hybrid supported metallocene catalyst, in which two or more kinds of metallocene compounds having specific substituents and structures as described are supported on a carrier, is used during polypropylene polymerization, high catalytic activity may be achieved in the polymerization process, and melt strength may be remarkably improved by introducing long chain branches into polypropylene molecules. The polypropylene having such properties may be applied to a wide range of products with different grades, depending on hydrogen reactivity.

For example, a melting point (Tm) of the polypropylene may be 150° C. or lower, or 115° C. to 150° C., or 148° C. or lower, or 118° C. to 148° C., or 145° C. or lower, or 120° C. to 145° C., or 140° C. or lower, or 125° C. to 140° C. The polypropylene may have a melting point (Tm) of 150° C. or lower, in terms of exhibiting high melt strength through the introduction of long chain branches (LCB) into the polymer molecule. However, in terms of preventing the occurrence of fouling in the polymerization process, the melting point (Tm) of the polypropylene may be 115° C. or higher.

In the present invention, the melting point (Tm) may be measured using a differential scanning calorimeter (DSC, device name: DSC 2920, manufacturer: TA instrument). In detail, the polypropylene polymer is heated to 200° C. by increasing the temperature, and then maintained at the same temperature for 5 minutes, followed by lowering the temperature to 30° C. Then, the temperature is increased again, and the temperature corresponding to a peak in the DSC (Differential Scanning Calorimeter, manufactured by TA) curve is determined as the melting point (Tm). In this regard, the temperature is increased and decreased at a rate of 10° C./min, respectively, and the melting point (Tm) is a result measured at a second temperature increase and decrease section. A detailed method of measuring the melting point (Tm) is as described in Experimental Example below.

Further, the polypropylene may have tacticity (Pentad sequence distribution, mmmm) of 60% to 95.8%, or 65% to 95.5%, or 70% to 95%, or 75% to 94.5%. In terms of effectively controlling tacticity of the molecular structure of the polymer and improving melt strength by introducing long chain branches (LCB) into the polypropylene molecules, the polypropylene may maintain tacticity (Pentad sequence distribution, mmmm) in the above range.

In the present invention, tacticity (Pentad sequence distribution, mmmm) may be measured using quantitative nuclear magnetic resonance (NMR) spectroscopy. In detail, after measuring the sequence distribution at the pentad level by $^{13}$C-NMR analysis, it is expressed as % of the pentad (mmmm) sequences having tacticity with respect to all pentad sequences. mmmm % is a value based on moles. A detailed method of measuring tacticity (Pentad sequence distribution, mmmm) is as described in Experimental Example below.

Advantageous Effects

The hybrid supported metallocene catalyst according to the present invention may exhibit high activity in propylene polymerization and may prepare a polypropylene having high melt strength by introducing long chain branches into the polypropylene molecule.

DETAILED DESCRIPTION OF THE EMBODIMENTS

Hereinafter, the actions and effects of the present invention will be described in more detail with reference to the specific exemplary embodiments. However, these exemplary embodiments are provided only for illustrating the present invention, and the scope of the present invention is not limited thereto.

EXAMPLES

<Preparation of First Metallocene Compound>

Synthesis Example 1

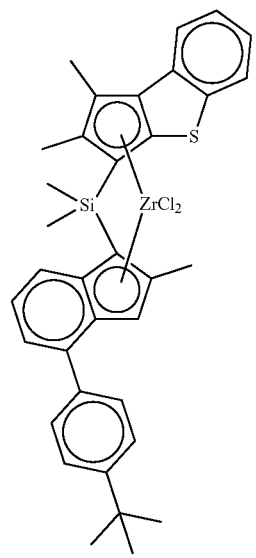

1-1 Preparation of Ligand Compound (1,2-dimethyl-3H-benzo[d]cyclopenta[b]thiophen-3-yl)dimethyl(2-methyl-4-(4'-tert-butylphenyl)-1H-inden-1-yl)silane In a reactor, 1 equivalent of 1,2-dimethyl-3H-benzo[d]cyclopenta[b]thiophene was dissolved in tetrahydrofuran (THF) (0.7 M), and n-butyl lithium (n-BuLi, 1.05 eq) was slowly added dropwise at −25° C., followed by stirring at room temperature for 3 hours. Thereafter, dichlorodimethylsilane (1.05 eq) was added at −10° C., and stirred at room temperature for 24 hours to prepare a mono-Si solution.

Separately, in another reactor, 1 equivalent of 4-(4'-tert-butylphenyl)-2-methyl-1H-indene was dissolved in a mixed solvent of toluene and THF (mixing volume ratio=5:1, 0.7 M), and n-BuLi (1.05 eq) was slowly added dropwise at −25° C., followed by stirring at room temperature for 3 hours. Thereafter, CuCN (2 mol %) was added, followed by stirring for 30 minutes. Then, the same equivalent of the mono-Si solution previously prepared was added, followed by stirring at room temperature for 24 hours. After work-up with water, the resultant was dried to obtain a ligand compound.

1-2 Preparation of Transition Metal Compound (1,2-dimethyl-3H-benzo[d]cyclopenta[b]thiophen-3-yl) dimethyl(2-methyl-4-(4'-tert-butylphenyl)-1H-inden-1-yl)silane Zirconium Dichloride The prepared ligand compound was added to and dissolved in a mixed solvent of toluene and ether (mixing volume ratio=2:1, 0.7 M), and n-BuLi (2.05 eq) was added at −25° C., followed by stirring at room temperature for 5 hours.

In a separate flask, ZrCl$_4$ (1 eq) was mixed with toluene (0.17 M) to prepare a slurry, and the prepared slurry was added to the ligand solution, followed by stirring at room temperature overnight.

When the reaction was completed, the solvent was dried under vacuum. Dichloromethane was added again, and then LiCl was removed by filtration. The filtrate was dried under vacuum, and toluene was added thereto, followed by recrystallization at room temperature. The resulting solid was filtered and dried under vacuum to obtain the title transition metal compound.

¹H-NMR (CDCl₃, 500 MHz): 0.66 (4H, m), 0.94 (6H, t), 1.33 (9H, s), 1.79 (6H, s), 2.12 (3H, s), 6.36 (1H, s), 7.30-7.49 (8H, m), 7.93 (1H, d), 8.05 (1H, d), 8.29 (1H, d).

Synthesis Example 2

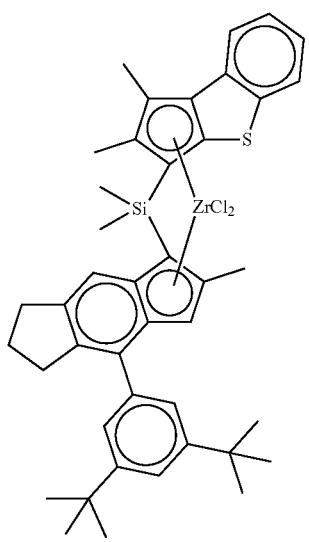

A transition metal compound having the title structure was prepared in the same manner as in Synthesis Example 1, except that 4-(3',5'-di-tert-butylphenyl)-2-methyl-1,5,6,7-tetrahydro-s-indacene was used as a reactant instead of 4-(4'-tert-butylphenyl)-2-methyl-1H-indene in Synthesis Example 1.

¹H-NMR (CDCl₃, 500 MHz): 0.22 (6H, s), 1.33 (18H, s) 1.79 (6H, s), 1.95 (2H, q), 2.30 (3H, s) 2.97-3.02 (4H, m), 6.44 (1H, s), 7.38-7.48 (3H, m), 7.73 (1H, d), 7.95 (1H, d). 8.01 (1H, d).

Synthesis Example 3

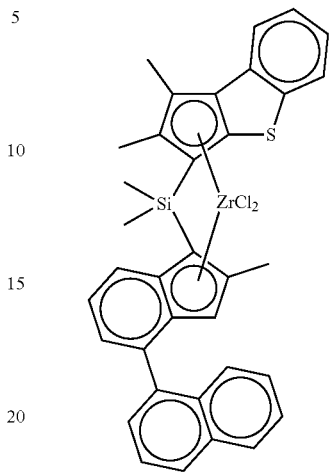

A transition metal compound having the title structure was prepared in the same manner as in Synthesis Example 1, except that 2-methyl-4-naphthyl-1H-indene was used as a reactant instead of 4-(4'-tert-butylphenyl)-2-methyl-1H-indene in Synthesis Example 1.

¹H-NMR (CDCl₃, 500 MHz): 0.66 (4H, m), 0.94 (6H, t), 1.79 (6H, s), 2.12 (3H, s), 6.36 (1H, s), 7.39-7.52 (6H, m), 7.77 (1H, t), 7.93 (1H, d), 8.05-8.09 (2H, m), 8.20 (1H, d), 8.29 (1H, d), 8.50 (1H, d), 8.95 (1H, d).

Synthesis Example 4

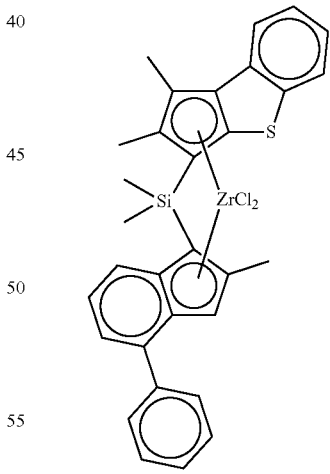

A transition metal compound having the title structure was prepared in the same manner as in Synthesis Example 1, except that 2-methyl-4-phenyl-1H-indene was used as a reactant instead of 4-(4'-tert-butylphenyl)-2-methyl-1H-indene in Synthesis Example 1.

¹H-NMR (CDCl₃, 500 MHz): 0.21 (6H, s), 1.79 (6H, s), 2.12 (3H, s), 6.36 (1H, s), 7.41-7.51 (9H, m), 7.93 (1H, d), 8.05 (1H, d), 8.29 (1H, d).

Synthesis Example 5

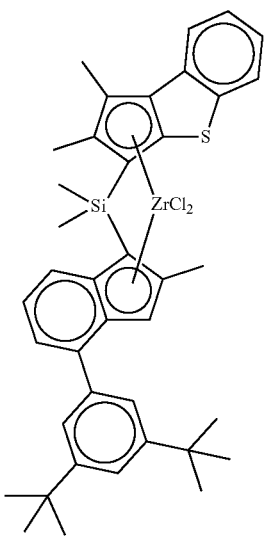

A transition metal compound having the title structure was prepared in the same manner as in Synthesis Example 1, except that 4-(3',5'-di-tert-butylphenyl)-2-methyl-1H-indene was used as a reactant instead of 4-(4'-tert-butylphenyl)-2-methyl-1H-indene in Synthesis Example 1.

$^1$H-NMR (CDCl$_3$, 500 MHz): 0.66 (4H, m), 0.94 (6H, t), 1.32 (18H, s) 1.79 (6H, s), 2.12 (3H, s), 6.36 (1H, s), 7.42-7.55 (5H, m), 7.73 (2H, s), 7.93 (1H, d), 8.05 (1H, d), 8.29 (1H, d).

Synthesis Example 6

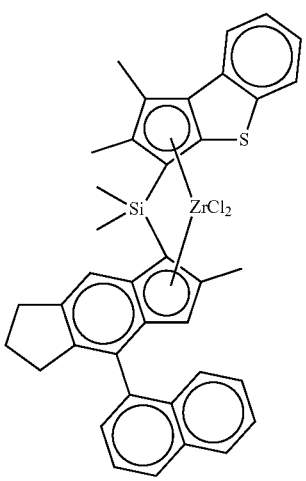

A transition metal compound having the title structure was prepared in the same manner as in Synthesis Example 1, except that 4-naphthyl-2-methyl-1,5,6,7-tetrahydro-s-indacene was used as a reactant instead of 4-(4'-tert-butylphenyl)-2-methyl-1H-indene in Synthesis Example 1.

$^1$H-NMR (CDCl$_3$, 500 MHz): 0.21 (6H, s) 1.79 (6H, s), 1.94 (2H, q), 2.12 (3H, s) 2.85-2.90 (4H, m), 6.36 (1H, s), 7.30-7.52 (5H, m), 7.75 (1H, m), 7.93 (1H, d), 8.01-8.05 (2H, m), 8.20 (1H, d), 8.50 (1H, d), 8.95 (1H, d).

Synthesis Example 7

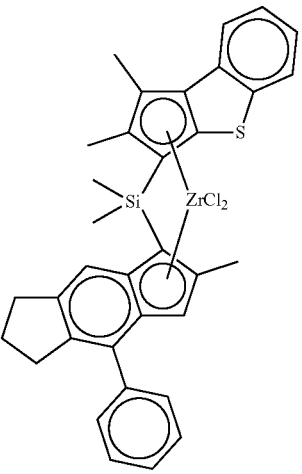

A transition metal compound having the title structure was prepared in the same manner as in Synthesis Example 1, except that 4-phenyl-2-methyl-1,5,6,7-tetrahydro-s-indacene was used as a reactant instead of 4-(4'-tert-butylphenyl)-2-methyl-1H-indene in Synthesis Example 1.

$^1$H-NMR (CDCl$_3$, 500 MHz): 0.23 (6H, s) 1.77 (6H, s), 1.98 (2H, q), 2.26 (3H, s) 2.97-3.02 (4H, m), 6.40 (1H, s), 7.32-7.52 (8H, m), 7.83 (1H, d), 8.05 (1H, m).

Synthesis Example 8

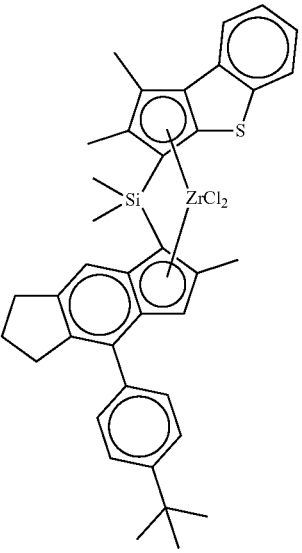

A transition metal compound having the title structure was prepared in the same manner as in Synthesis Example 1, except that 4-(4'-tert-butylphenyl)-2-methyl-1,5,6,7-tetrahydro-s-indacene was used as a reactant instead of 4-(4'-tert-butylphenyl)-2-methyl-1H-indene in Synthesis Example 1.

¹H-NMR (CDCl₃, 500 MHz): 0.22 (6H, s), 1.33 (9H, s) 1.79 (6H, s), 1.95 (2H, q), 2.30 (3H, s) 2.97-3.02 (4H, m), 6.44 (1H, s), 7.38-7.48 (5H, m), 7.73 (1H, d), 8.01 (1H, d).

Synthesis Example 9

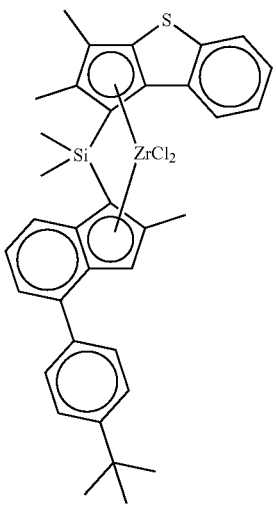

A transition metal compound having the title structure was prepared in the same manner as in Synthesis Example 1, except that 1,2-dimethyl-3H-benzo[b]cyclopenta[d]thiophene was used instead of 1,2-dimethyl-3H-benzo[d]cyclopenta[b]thiophene in Synthesis Example 1.

¹H-NMR (CDCl₃, 500 MHz): 0.24 (6H, s), 1.40 (9H, s), 1.79 (6H, s), 2.12 (3H, s), 6.36 (1H, s), 7.30-7.51 (8H, m), 7.70 (1H, d), 7.90 (1H, d), 8.10 (1H, d).

Synthesis Example 10

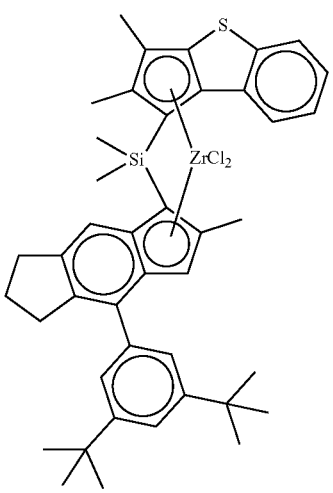

A transition metal compound having the title structure was prepared in the same manner as in Synthesis Example 2, except that 1,2-dimethyl-3H-benzo[b]cyclopenta[d]thiophene was used as a reactant instead of 1,2-dimethyl-3H-benzo[d]cyclopenta[b]thiophene in Synthesis Example 2.

¹H-NMR (CDCl₃, 500 MHz): 0.23 (6H, s), 1.32 (18H, s), 1.75 (6H, s), 1.90 (2H, q), 2.28 (3H, s), 2.85 (4H, m), 6.35 (1H, s), 7.45-7.49 (3H, m), 7.74 (3H, m), 7.90 (1H, d).

Synthesis Example 11

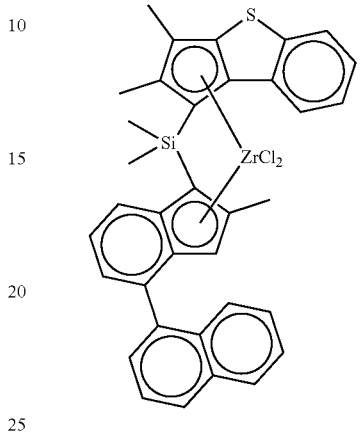

A transition metal compound having the title structure was prepared in the same manner as in Synthesis Example 3, except that 1,2-dimethyl-3H-benzo[b]cyclopenta[d]thiophene was used instead of 1,2-dimethyl-3H-benzo[d]cyclopenta[b]thiophene in Synthesis Example 3.

¹H-NMR (CDCl₃, 500 MHz): 0.21 (6H, s), 1.79 (6H, s), 2.18 (6H, s), 6.95 (1H, s), 7.323-7.42 (6H, m), 7.73-7.79 (2H, m), 7.95 (1H, d), 8.10 (1H, d), 8.18 (1H, d), 8.25 (1H, d), 8.38 (1H, d), 8.59 (1H, d).

Synthesis Example 12

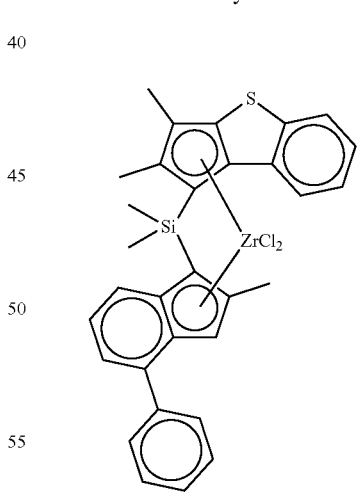

A transition metal compound having the title structure was prepared in the same manner as in Synthesis Example 4, except that 1,2-dimethyl-3H-benzo[b]cyclopenta[d]thiophene was used as a reactant instead of 1,2-dimethyl-3H-benzo[d]cyclopenta[b]thiophene in Synthesis Example 4.

¹H-NMR (CDCl₃, 500 MHz): 0.24 (6H, s), 1.79 (6H, s), 2.20 (3H, s), 7.30-7.49 (9H, m), 7.79 (1H, d), 7.93 (1H, d), 8.10 (1H, d).

Synthesis Example 13

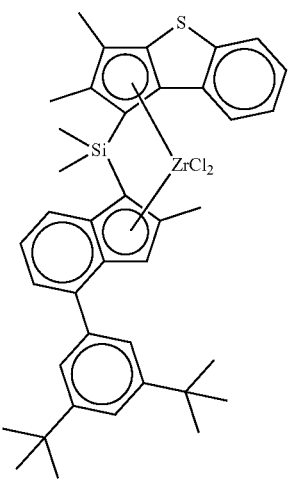

A transition metal compound having the title structure was prepared in the same manner as in Synthesis Example 5, except that 1,2-dimethyl-3H-benzo[b]cyclopenta[d]thiophene was used as a reactant instead of 1,2-dimethyl-3H-benzo[d]cyclopenta[b]thiophene in Synthesis Example 5.

¹H-NMR (CDCl₃, 500 MHz): 0.24 (6H, s), 1.35 (18H, s), 1.70 (6H, s), 2.17 (3H, s), 6.29 (1H, s), 7.30-7.43 (5H, m), 7.74 (1H, d), 7.80 (1H, d), 8.17 (1H, d).

Synthesis Example 14

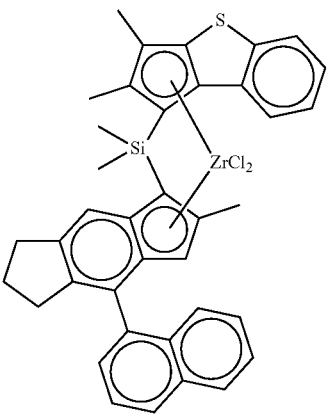

A transition metal compound having the title structure was prepared in the same manner as in Synthesis Example 6, except that 1,2-dimethyl-3H-benzo[b]cyclopenta[d]thiophene was used as a reactant instead of 1,2-dimethyl-3H-benzo[d]cyclopenta[b]thiophene in Synthesis Example 6.

¹H-NMR (CDCl₃, 500 MHz): 0.20 (6H, s), 1.74 (6H, s), 1.95 (2H, q), 2.18 (3H, s), 2.80 (4H, m), 6.37 (1H, s), 7.40-7.43 (5H, m), 7.70 (2H, m), 7.90 (1H, d), 7.99 (1H, d), 8.17 (1H, d), 8.45 (1H, d), 8.79 (1H, d).

Synthesis Example 15

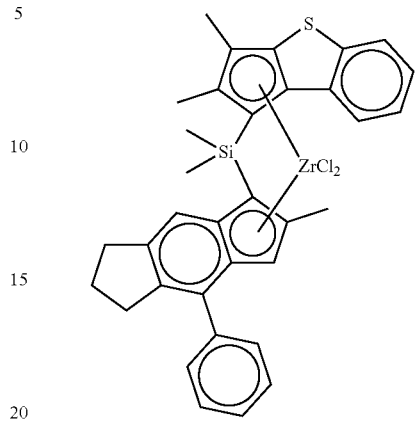

A transition metal compound having the title structure was prepared in the same manner as in Synthesis Example 7, except that 1,2-dimethyl-3H-benzo[b]cyclopenta[d]thiophene was used as a reactant instead of 1,2-dimethyl-3H-benzo[d]cyclopenta[b]thiophene in Synthesis Example 7.

¹H-NMR (CDCl₃, 500 MHz): 0.25 (6H, s), 1.79 (6H, s), 1.89 (2H, q), 2.18 (3H, s), 2.80 (4H, m), 6.35 (1H, s), 7.39-7.43 (8H, m), 7.74 (1H, d), 7.93 (1H, d).

Synthesis Example 16

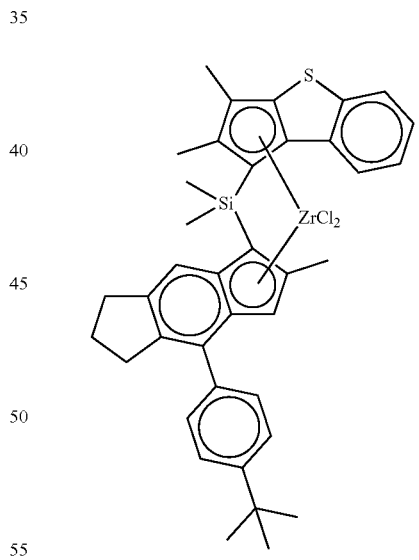

A transition metal compound having the title structure was prepared in the same manner as in Synthesis Example 8, except that 1,2-dimethyl-3H-benzo[b]cyclopenta[d]thiophene was used as a reactant instead of 1,2-dimethyl-3H-benzo[d]cyclopenta[b]thiophene in Synthesis Example 8.

¹H-NMR (CDCl₃, 500 MHz): 0.22 (6H, s), 1.33 (9H, s), 1.71 (6H, s), 1.95 (2H, q), 2.28 (3H, s), 2.85 (4H, m), 6.35 (1H, s), 7.30-7.43 (7H, m), 7.74 (1H, d), 7.90 (1H, d).

Synthesis Example 17

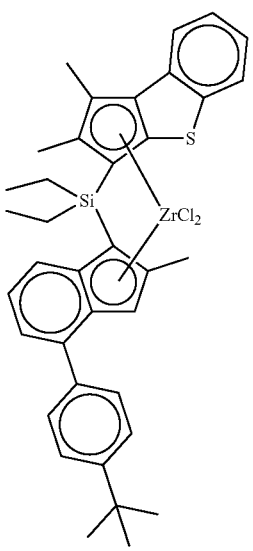

A transition metal compound having the title structure was prepared in the same manner as in Synthesis Example 1, except that dichlorodiethylsilane was used instead of dichlorodimethylsilane in Synthesis Example 1.

$^1$H-NMR (CDCl$_3$, 500 MHz): 0.66 (4H, m), 0.94 (6H, t), 1.33 (9H, s), 1.79 (6H, s), 2.12 (3H, s), 6.36 (1H, s), 7.30-7.49 (8H, m), 7.93 (1H, d), 8.05 (1H, d), 8.29 (1H, d).

Synthesis Example 18

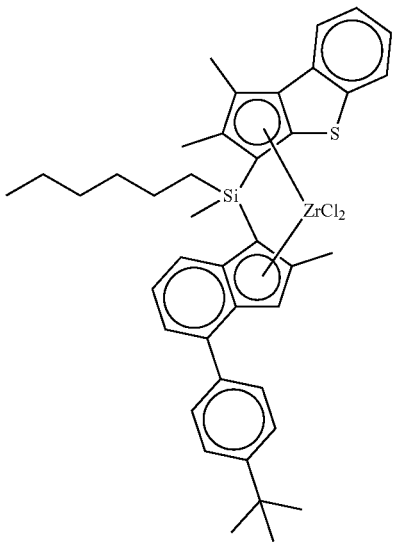

A transition metal compound having the title structure was prepared in the same manner as in Synthesis Example 8, except that dichlorohexylmethylsilane was used instead of dichlorodimethylsilane in Synthesis Example 1.

$^1$H-NMR (CDCl$_3$, 500 MHz): 0.21 (3H, s), 0.60 (2H, t), 0.88 (2H, t), 1.23-1.29 (6H, m), 1.33 (9H, s), 1.79 (6H, s), 2.12 (3H, s), 6.36 (1H, s), 7.30-7.49 (8H, m), 7.93 (1H, d), 8.05 (1H, d), 8.29 (1H, d).

<Preparation of Second Metallocene Compound>

Synthesis Example 19

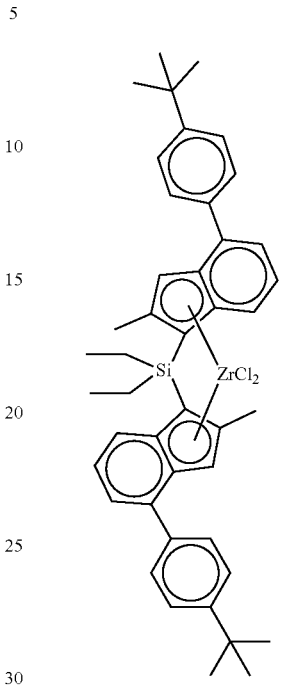

19-1. Preparation of (diethylsilane-diyl)-bis((2-methyl-4-tert-butyl-phenylindenyl)silane 2-methyl-4-tert-butyl-phenylindene (20.0 g) was dissolved in a toluene/THF=10/1 solution (220 mL), and n-butyl lithium solution (2.5 M, hexane solvent, 22.2 g) was slowly added dropwise at 0° C., followed by stirring at room temperature for one day. Thereafter, diethyldichlorosilane (6.2 g) was slowly added dropwise to the mixed solution at −78° C., and stirred at for about 10 minutes, and then stirred at room temperature for one day. Thereafter, water was added to separate an organic layer, and then the solvent was distilled under reduced pressure to obtain (diethylsilane-diyl)-bis((2-methyl-4-tert-butyl-phenylindenyl)silane.

19-2. Preparation of [(diethylsilane-diyl)-bis((2-methyl-4-tert-butyl-phenylindenyl)]zirconium Dichloride The (diethylsilane-diyl)-bis((2-methyl-4-tert-butyl-phenylindenyl)silane prepared in 19-1 was dissolved in a toluene/THF=5/1 solution (120 mL), and then n-butyl lithium solution (2.5 M, hexane solvent, 22.2 g) was slowly added dropwise at −78° C., followed by stirring at room temperature for one day. To the resulted reactant solution, a solution prepared by diluting zirconium chloride (8.9 g) with toluene (20 mL) was slowly added dropwise at −78° C., and stirred at room temperature for one day. From the reactant solution, the solvent was removed under reduced pressure, and dichloromethane was added, followed by filtering. The filtrate was removed by distillation under reduced pressure. Recrystallization was performed using toluene and hexane to obtain high-purity rac-[(diethylsilane-diyl)-bis((2-methyl-4-tert-butyl-phenylindenyl)]zirconium dichloride (10.1 g, 34%, rac:meso=20:1).

<Preparation of Supported Catalyst>

Preparation Example 1: Preparation of Hybrid Supported Metallocene Catalyst 100 mL of a toluene solution was put in a high-pressure reactor, and the reactor temperature was maintained at 40° C. 10 g of silica (SP2408HT) which was dehydrated under vacuum at a temperature of 600° C. for 12 hours was put in a 500 L reactor, and 12 mmol of methylaluminoxane (MAO) was added, and allowed to react at 95° C. for 12 hours. Thereafter, 30 µmol of the first metallocene compound of Synthesis Example 1 and 60 µmol of the second metallocene compound of Synthesis Example 19 were dissolved in toluene, and allowed to react for 5 hours under stirring at 200 rpm at 50° C.

When the reaction was completed, the stirring was stopped, followed by washing with a sufficient amount of toluene. Then, 50 mL of toluene was added again, and stirred for 10 minutes. Then, the stirring was stopped, and washing was performed using a sufficient amount of toluene to remove compounds which did not participate in the reaction. Thereafter, 50 mL of hexane was added, followed by stirring. This hexane slurry was transferred to a filter to perform filtration.

The resulting product was primarily dried at room temperature under reduced pressure for 5 hours, and then secondarily dried at 40° C. under reduced pressure for 4 hours to obtain a hybrid supported catalyst.

Preparation Example 2: Preparation of Hybrid Supported Metallocene Catalyst

A hybrid supported metallocene catalyst was prepared in the same manner as in Preparation Example 1, except that 60 µmol of the metallocene compound prepared in Synthesis Example 1 was added, and 60 µmol of the metallocene compound prepared in Synthesis Example 19 was added.

Preparation Example 3: Preparation of Hybrid Supported Metallocene Catalyst

A hybrid supported metallocene catalyst was prepared in the same manner as in Preparation Example 1, except that 12 µmol of the metallocene compound prepared in Synthesis Example 1 was added, and 60 µmol of the metallocene compound prepared in Synthesis Example 19 was added.

Preparation Example 4: Preparation of Hybrid Supported Metallocene Catalyst

A hybrid supported metallocene catalyst was prepared in the same manner as in Preparation Example 1, except that the metallocene compound prepared in Synthesis Example 2 was used instead of the first metallocene compound prepared in Synthesis Example 1.

Preparation Example 5: Preparation of Hybrid Supported Metallocene Catalyst

A hybrid supported metallocene catalyst was prepared in the same manner as in Preparation Example 1, except that the metallocene compound prepared in Synthesis Example 3 was used instead of the first metallocene compound prepared in Synthesis Example 1.

Preparation Example 6: Preparation of Hybrid Supported Metallocene Catalyst

A hybrid supported metallocene catalyst was prepared in the same manner as in Preparation Example 1, except that the metallocene compound prepared in Synthesis Example 4 was used instead of the first metallocene compound prepared in Synthesis Example 1.

Preparation Example 7: Preparation of Hybrid Supported Metallocene Catalyst

A hybrid supported metallocene catalyst was prepared in the same manner as in Preparation Example 1, except that the metallocene compound prepared in Synthesis Example 5 was used instead of the first metallocene compound prepared in Synthesis Example 1.

Preparation Example 8: Preparation of Hybrid Supported Metallocene Catalyst

A hybrid supported metallocene catalyst was prepared in the same manner as in Preparation Example 1, except that the metallocene compound prepared in Synthesis Example 6 was used instead of the first metallocene compound prepared in Synthesis Example 1.

Preparation Example 9: Preparation of Hybrid Supported Metallocene Catalyst

A hybrid supported metallocene catalyst was prepared in the same manner as in Preparation Example 1, except that the metallocene compound prepared in Synthesis Example 7 was used instead of the first metallocene compound prepared in Synthesis Example 1.

Preparation Example 10: Preparation of Hybrid Supported Metallocene Catalyst A hybrid supported metallocene catalyst was prepared in the same manner as in Preparation Example 1, except that the metallocene compound prepared in Synthesis Example 8 was used instead of the first metallocene compound prepared in Synthesis Example 1.

Preparation Example 11: Preparation of Hybrid Supported Metallocene Catalyst A hybrid supported metallocene catalyst was prepared in the same manner as in Preparation Example 1, except that the metallocene compound prepared in Synthesis Example 9 was used instead of the first metallocene compound prepared in Synthesis Example 1.

Preparation Example 12: Preparation of Hybrid Supported Metallocene Catalyst A hybrid supported metallocene catalyst was prepared in the same manner as in Preparation Example 1, except that the metallocene compound prepared in Synthesis Example 10 was used instead of the first metallocene compound prepared in Synthesis Example 1.

Preparation Example 13: Preparation of Hybrid Supported Metallocene Catalyst A hybrid supported metallocene catalyst was prepared in the same manner as in Preparation Example 1, except that the metallocene compound prepared in Synthesis Example 11 was used instead of the first metallocene compound prepared in Synthesis Example 1.

Preparation Example 14: Preparation of Hybrid Supported Metallocene Catalyst A hybrid supported metallocene catalyst was prepared in the same manner as in Preparation Example 1, except that the metallocene compound prepared in Synthesis Example 12 was used instead of the first metallocene compound prepared in Synthesis Example 1.

Preparation Example 15: Preparation of Hybrid Supported Metallocene Catalyst A hybrid supported metallocene catalyst was prepared in the same manner as in Preparation Example 1, except that the metallocene compound prepared in Synthesis Example 13 was used instead of the first metallocene compound prepared in Synthesis Example 1.

Preparation Example 16: Preparation of Hybrid Supported Metallocene Catalyst A hybrid supported metallocene catalyst was prepared in the same manner as in Preparation Example 1, except that the metallocene compound prepared in Synthesis Example 14 was used instead of the first metallocene compound prepared in Synthesis Example 1.

Preparation Example 17: Preparation of Hybrid Supported Metallocene Catalyst A hybrid supported metallocene catalyst was prepared in the same manner as in Preparation Example 1, except that the metallocene compound prepared in Synthesis Example 15 was used instead of the first metallocene compound prepared in Synthesis Example 1.

Preparation Example 18: Preparation of Hybrid Supported Metallocene Catalyst A hybrid supported metallocene catalyst was prepared in the same manner as in Preparation Example 1, except that the metallocene compound prepared in Synthesis Example 16 was used instead of the first metallocene compound prepared in Synthesis Example 1.

Preparation Example 19: Preparation of Hybrid Supported Metallocene Catalyst A hybrid supported metallocene catalyst was prepared in the same manner as in Preparation Example 1, except that the metallocene compound prepared in Synthesis Example 17 was used instead of the first metallocene compound prepared in Synthesis Example 1.

Preparation Example 20: Preparation of Hybrid Supported Metallocene Catalyst A hybrid supported metallocene catalyst was prepared in the same manner as in Preparation Example 1, except that the metallocene compound prepared in Synthesis Example 18 was used instead of the first metallocene compound prepared in Synthesis Example 1.

Comparative Preparation Example 1: Preparation of Single Supported Metallocene Catalyst 100 mL of a toluene solution was put in a high-pressure reactor, and the reactor temperature was maintained at 40° C. 10 g of silica (SP2408HT) which was dehydrated under vacuum at a temperature of 600° C. for 12 hours was put in a 500 L reactor, and 12 mmol of methylaluminoxane (MAO) was added, and allowed to react at 95° C. for 12 hours. Thereafter, 90 μmol of the second metallocene compound prepared in Synthesis Example 19 was dissolved in toluene, and added thereto, and allowed to react for 5 hours under stirring at 200 rpm at 50° C.

When the reaction was completed, the stirring was stopped, followed by washing with a sufficient amount of toluene. Then, 50 mL of toluene was added again, and stirred for 10 minutes. Then, the stirring was stopped, and washing was performed using a sufficient amount of toluene to remove compounds which did not participate in the reaction. Thereafter, 50 mL of hexane was added, followed by stirring. This hexane slurry was transferred to a filter to perform filtration.

The resulting product was primarily dried at room temperature under reduced pressure for 5 hours, and then secondarily dried at 40° C. under reduced pressure for 4 hours to obtain a single supported catalyst.

Comparative Preparation Example 2: Preparation of Single Supported Metallocene Catalyst A single supported metallocene catalyst was prepared in the same manner as in Comparative Preparation Example 1, except that the first metallocene compound prepared in Synthesis Example 1 was used instead of the second metallocene compound prepared in Synthesis Example 19.

Comparative Preparation Example 3: Preparation of Single Supported Metallocene Catalyst A single supported metallocene catalyst was prepared in the same manner as in Comparative Preparation Example 1, except that the first metallocene compound prepared in Synthesis Example 2 was used instead of the second metallocene compound prepared in Synthesis Example 19.

Comparative Preparation Example 4: Preparation of Hybrid Supported Metallocene Catalyst A hybrid supported metallocene catalyst was prepared in the same manner as in Preparation Example 1, except that 1-(1-((2,3-dimethyl-3a,8b-dihydro-1H-benzo[b]cyclopenta[d]thiophen-1-yl)dimethylsilyl)-2-methyl-1H-inden-4-yl)-1,2,3,4-tetrahydroquinoline zirconium dichloride having the following structural formula was used as the first metallocene compound instead of the first metallocene compound prepared in Synthesis Example 1.

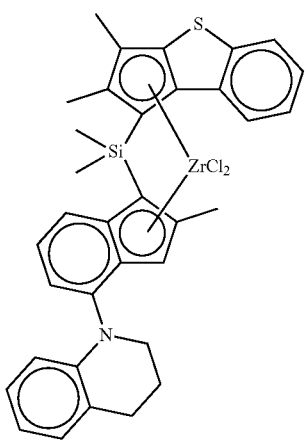

Comparative Preparation Example 5: Preparation of Hybrid Supported Metallocene Catalyst A hybrid supported metallocene catalyst was prepared in the same manner as in Preparation Example 1, except that [(diethylsilane-diyl)-bis(4-tert-butyl-phenylindenyl)]zirconium dichloride having the following structural formula was used as the second metallocene compound instead of the second metallocene compound prepared in Synthesis Example 19.

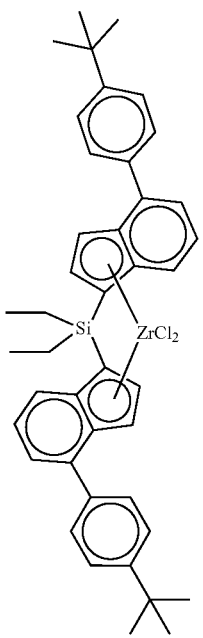

Comparative Preparation Example 6: Preparation of Hybrid Supported Metallocene Catalyst A hybrid supported metallocene catalyst was prepared in the same manner as in Preparation Example 1, except that [(methyl-tert-butoxyhexylsilane-diyl)-bis((2-methyl-4-tert-butyl-phenylindenyl)]zirconium dichloride having the following structural formula was used as the second metallocene compound instead of the second metallocene compound prepared in Synthesis Example 19.

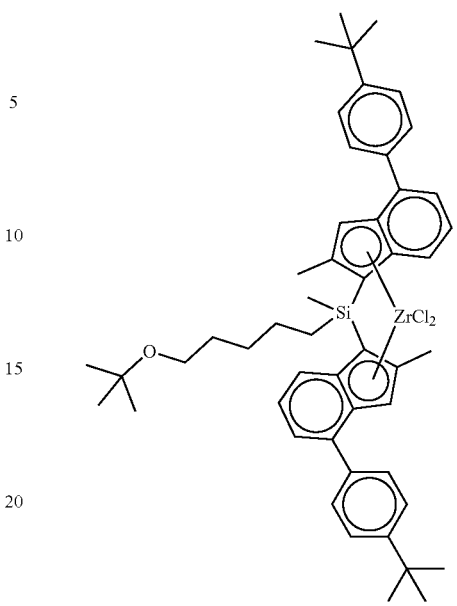

<Polypropylene Polymerization>

Example 1

A 2 L stainless steel reactor was vacuum-dried at 65° C., and cooled down. 3 mL of triethylaluminum was placed in the reactor at room temperature, 820 ppm of hydrogen gas was injected, and then 1.5 L of propylene was added. In this regard, the injection amount of hydrogen gas is a value based on the content of propylene monomer.

After stirring for 10 minutes, 30 mg of the hybrid supported metallocene catalyst of Preparation Example 1 and 20 mL of hexane slurry were prepared at 20° C., and added to the reactor under an argon (Ar) condition. After the reactor temperature was gradually raised to 70° C., homopolymerization of propylene was performed at a pressure of 30 bar for 1 hour, and unreacted propylene was vented.

Examples 2 to 20

Each homopolypropylene was prepared in the same manner as in Example 1, except that each of the hybrid supported metallocene catalysts prepared in Preparation Examples 2 to 20 was used instead of the hybrid supported metallocene catalyst prepared in Preparation Example 1.

Comparative Examples 1 to 6

Each homopolypropylene was prepared in the same manner as in Example 1, except that each of the single supported catalysts prepared in Comparative Preparation Examples 1 to 3 or each of the hybrid supported metallocene catalysts prepared in Comparative Preparation Examples 4 to 6 was used instead of the hybrid supported metallocene catalyst prepared in Preparation Example 1.

Experimental Example: Evaluation of Physical Properties of Polypropylene

The activities of the metallocene catalysts used in the polymerization processes according to Examples and Comparative Examples and physical properties of the homopolypropylenes prepared using the supported catalysts were evaluated in the following manner. The results are shown in Table 1 below.

(1) Activity (kg PP/g·cat·hr)

Activity was calculated by a ratio of the weight of the produced homopolypropylene (kg PP) to the weight of the used supported catalyst (g) per unit time (h).

(2) Melting Point (Tm)

A melting point (Tm) of the propylene polymer was measured using a differential scanning calorimeter (DSC, device name: DSC 2920, manufacturer: TA instrument). In detail, the polymer was heated to 220° C. by increasing the temperature, and then maintained at the same temperature for 5 minutes, followed by lowering the temperature to 20° C. Then, the temperature was increased again, and the temperature corresponding to a peak in the DSC (Differential Scanning Calorimeter, manufactured by TA) curve was determined as the melting point. In this regard, the temperature was increased and decreased at a rate of 10° C./min, respectively, and the melting point was a result measured at a second temperature increase and decrease section.

(3) Tacticity (Pentad Sequence Distribution)

Tacticity of the propylene polymer was measured using quantitative nuclear magnetic resonance (NMR) spectroscopy as in a paper (V. Busico and R. Cipullo, Progress in Polymer Science, 2001, 26, 443-533).

In detail, after measuring the sequence distribution at the pentad level by $^{13}$C-NMR analysis, tacticity (Pentad sequence distribution) of the homopolypropylenes of Examples and Comparative Examples was expressed as % of the pentad (mmmm) sequences having tacticity with respect to all pentad sequences. mmmm % is a value based on moles.

In this regard, Bruker 500 MHz NMR was used as a measuring instrument, and the polypropylene was dissolved in 1.1.2.2-tetrachloroethane (TCE-d$_2$) solvent, and measured at an absolute temperature of 393K ($^{13}$C; pulse sequence=zgig30, ns=4096, d$_1$=10 sec, $^1$H; pulse sequence=zg30, ns=128, d$_1$=3 sec). The sequence distribution was analyzed with reference to an analysis method AMT-3989-0k, and tacticity (mmmm %) was calculated according to a paper V. Busico and R. Cipullo, Progress in Polymer Science, 2001, 26, 443-533.

TABLE 1

| | Catalyst | Molar ratio of catalyst precursors* | Activity (kg PP/g Cat · hr) | Tm (° C.) | Pentad sequence distribution (mmmm, %) |
|---|---|---|---|---|---|
| Example 1 | Preparation Example 1 | 1:2 | 13.3 | 137.2 | 88 |
| Example 2 | Preparation Example 2 | 1:1 | 9.8 | 125.3 | 76.8 |
| Example 3 | Preparation Example 3 | 1:5 | 13.8 | 146.6 | 94.2 |
| Example 4 | Preparation Example 4 | 1:2 | 12.2 | 138.7 | 89.6 |
| Example 5 | Preparation Example 5 | 1:2 | 12.5 | 136.8 | 88.8 |
| Example 6 | Preparation Example 6 | 1:2 | 13.1 | 137.2 | 87.9 |
| Example 7 | Preparation Example 7 | 1:2 | 13.5 | 136.2 | 88.7 |
| Example 8 | Preparation Example 8 | 1:2 | 12.5 | 138.1 | 87.4 |
| Example 9 | Preparation Example 9 | 1:2 | 13.5 | 136.5 | 88.9 |
| Example 10 | Preparation Example 10 | 1:2 | 12.7 | 135.8 | 89.1 |
| Example 11 | Preparation Example 11 | 1:2 | 12.9 | 136.2 | 87.9 |
| Example 12 | Preparation Example 12 | 1:2 | 13.1 | 136.8 | 87.6 |
| Example 13 | Preparation Example 13 | 1:2 | 12.8 | 137.1 | 89.1 |
| Example 14 | Preparation Example 14 | 1:2 | 13.2 | 136.1 | 87.4 |
| Example 15 | Preparation Example 15 | 1:2 | 12.2 | 135.9 | 87.8 |
| Example 16 | Preparation Example 16 | 1:2 | 13.2 | 135.4 | 88.8 |
| Example 17 | Preparation Example 17 | 1:2 | 12.8 | 134.8 | 88.0 |
| Example 18 | Preparation Example 18 | 1:2 | 13.8 | 136.1 | 89.1 |
| Example 19 | Preparation Example 19 | 1:2 | 13.4 | 136.0 | 88.1 |
| Example 20 | Preparation Example 20 | 1:2 | 13.6 | 135.8 | 87.8 |
| Comparative Example 1 | Comparative Preparation Example 1 | Single supported | 13.0 | 153 | 98 |
| Comparative Example 2** | Comparative Preparation Example 2 | Single supported | 12.1 | not measurable | 24.8 |

TABLE 1-continued

| | Catalyst | Molar ratio of catalyst precursors* | Activity (kg PP/g Cat · hr) | Tm (° C.) | Pentad sequence distribution (mmmm, %) |
|---|---|---|---|---|---|
| Comparative Example 3** | Comparative Preparation Example 3 | Single supported | 11.0 | not measurable | 25.6 |
| Comparative Example 4 | Comparative Preparation Example 4 | 1:2 | 7.6 | 153 | 97.7 |
| Comparative Example 5 | Comparative Preparation Example 5 | 1:2 | 6.5 | 154 | 45.5 |
| Comparative Example 6 | Comparative Preparation Example 6 | 1:2 | 7.0 | 151 | 96.8 |

*A molar ratio of catalyst precursors represents a molar ratio of a first metallocene compound:a second metallocene compound.
**Comparative Examples 2 and 3 showed sticky polymers, of which physical properties were not measurable.

Referring to Table 1, Examples 1 to 20, in which the hybrid supported metallocene catalysts of Preparation Examples 1 to 20 according to exemplary embodiments of the present invention were used, respectively, showed a melting point of 125.3° C. to 138.7° C. while exhibiting high activity during propylene polymerization, suggesting that homopolypropylenes having improved melt strength were prepared by effectively controlling the tacticity of the molecular structure of the polypropylenes and introducing long chain branches (LCB) into the molecules.

In contrast, Comparative Example 1, in which only the second metallocene compound of Chemical Formula 2 was supported alone, showed reduced melt strength because long chain branches (LCB) were not introduced into the polypropylene molecules, and showed a high melting point of 153° C. Further, Comparative Examples 2 and 3, in which only the first metallocene compound of Chemical Formula 1 was supported alone, showed remarkably low tacticity during propylene polymerization, and the resulting polypropylenes had a highly viscous atactic form.

Further, Comparative Example 4, in which the compound prepared by changing the substituent of the indene ligand in Chemical Formula 1 was used as a first precursor, and Comparative Examples 5 and 6, in which the compound prepared by changing the substituent of the indene ligand in Chemical Formula 2 or the compound prepared by changing the bridge substituent was used as a second precursor, showed reduced melt strength due to the reduced content of long chain branches (LCB) in the polypropylene molecule, and showed a high melting point of 153° C., 154° C., and 151° C., respectively, and remarkably lowered catalytic activity of 7.6 kg PP/g Cat·hr, 6.5 kg PP/g Cat·hr, and 7.0 kg PP/g Cat·hr, respectively.

The invention claimed is:

1. A hybrid supported metallocene catalyst comprising one or more first metallocene compounds selected from compounds represented by Chemical Formula 1; one or more second metallocene compounds selected from compounds represented by Chemical Formula 2; and a carrier supporting the first and second metallocene compounds:

[Chemical Formula 1]

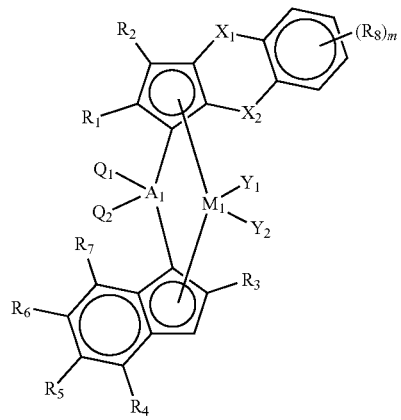

in Chemical Formula 1, $M_1$ is a Group 4 transition metal, $A_1$ is carbon, silicon, or germanium, $Q_1$ and $Q_2$ are each independently $C_{1-20}$ alkyl, $R_1$ to $R_3$ are each independently $C_{1-6}$ linear alkyl, $R_4$ is $C_{6-12}$ aryl unsubstituted or substituted with $C_{1-8}$ alkyl, $R_5$ to $R_7$ are each independently hydrogen, $C_{1-12}$ alkyl, $C_{2-12}$ alkenyl, $C_{6-18}$ aryl, $C_{7-20}$ alkylaryl, or $C_{7-20}$ arylalkyl, or two neighboring groups of $R_5$ and $R_6$, or $R_6$ and $R_7$ are connected to each other to form an $C_{3-12}$ aliphatic ring group, $R_8$ is $C_{1-20}$ alkyl, $C_{2-20}$ alkenyl, $C_{6-30}$ aryl, $C_{7-30}$ alkylaryl, or $C_{7-30}$ arylalkyl, $X_1$ and $X_2$ are each independently a single bond, or S or $CR_aR_b$, wherein at least one of $X_1$ or $X_2$ is S, and $R_a$ and $R_b$ are each independently hydrogen, $C_{1-20}$ alkyl, $C_{2-20}$ alkenyl, $C_{6-30}$ aryl, $C_{7-30}$ alkylaryl, or $C_{7-30}$ arylalkyl, $Y_1$ and $Y_2$ are each independently halogen, and m is an integer of 0 to 4, and when m is an integer of 2 to 4, each $R_8$ is the same as or different from each other,

[Chemical Formula 2]

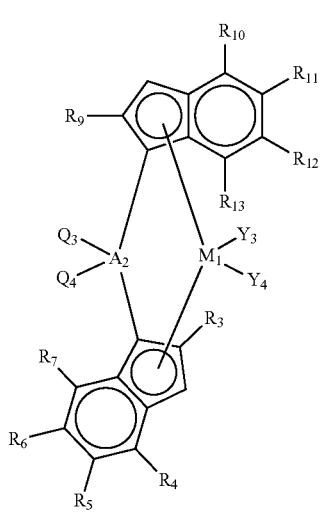

in Chemical Formula 2, $M_2$ is a Group 4 transition metal;

$A_2$ is carbon, silicon, or germanium, $Y_3$ and $Y_4$ are each independently halogen, $R_9$ and $R_{14}$ are each independently $C_{1-6}$ linear or branched alkyl or $C_{6-12}$ aryl, $R_{10}$ and $R_{15}$ are each independently $C_{6-12}$ aryl unsubstituted or substituted with $C_{1-8}$ alkyl, $R_{11}$ to $R_{13}$ and $R_{16}$ to $R_{18}$ are each independently hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-40}$ aryl, $C_{7-20}$ alkylaryl, or $C_{7-20}$ arylalkyl, and $Q_3$ and $Q_4$ are the same as each other, and are each $C_{2-20}$ alkyl.

2. The hybrid supported metallocene catalyst of claim 1, wherein $Q_1$ and $Q_2$ are each independently $C_{1-6}$ alkyl, $Y_1$ and $Y_2$ are each independently halogen, $A_1$ is silicon, and $M_1$ is zirconium or hafnium.

3. The hybrid supported metallocene catalyst of claim 1, wherein $R_1$ to $R_3$ are each methyl.

4. The hybrid supported metallocene catalyst of claim 1, wherein $R_4$ is phenyl or naphthyl unsubstituted or substituted with $C_{3-6}$ branched alkyl.

5. The hybrid supported metallocene catalyst of claim 1, wherein $R_4$ is phenyl, 4-(tert-butyl)phenyl, 3,5-di-(tert-butyl)phenyl, or naphthyl.

6. The hybrid supported metallocene catalyst of claim 1, wherein $R_5$ to $R_7$ are each hydrogen, or two neighboring groups of $R_5$ and $R_6$, or $R_6$ and $R_7$ are connected to each other to form a cyclopentyl group.

7. The hybrid supported metallocene catalyst of claim 1, wherein any one of $X_1$ or $X_2$ is S, and the other is a single bond.

8. The hybrid supported metallocene catalyst of claim 1, wherein the first metallocene compound is represented by any one of the following structural formulae:

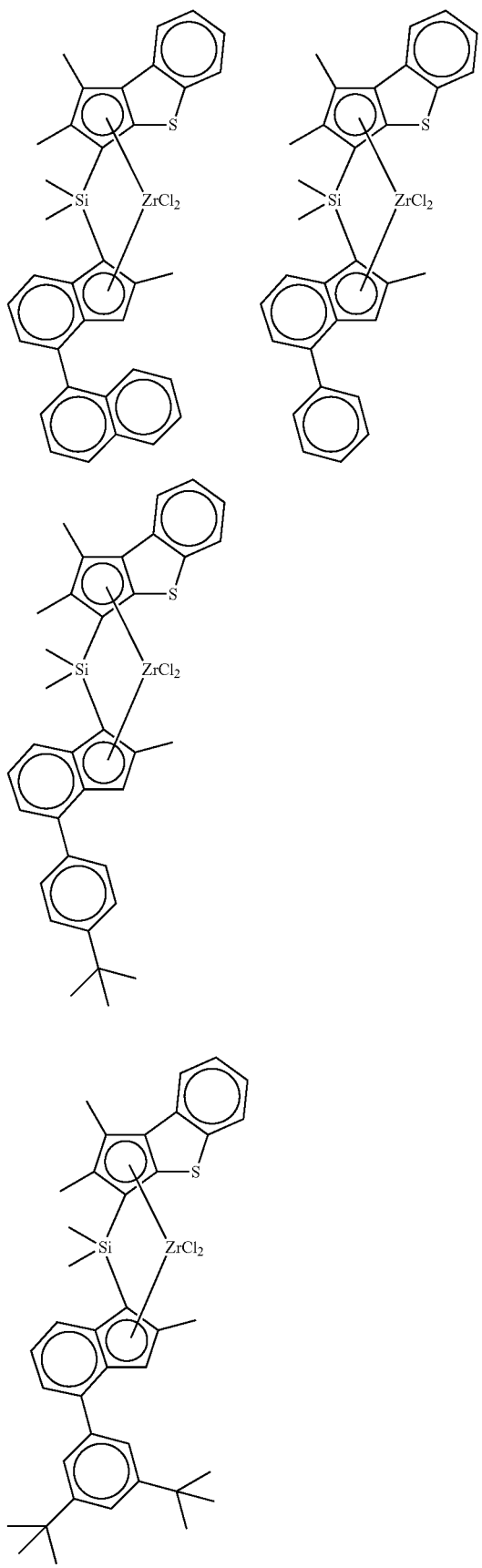

-continued
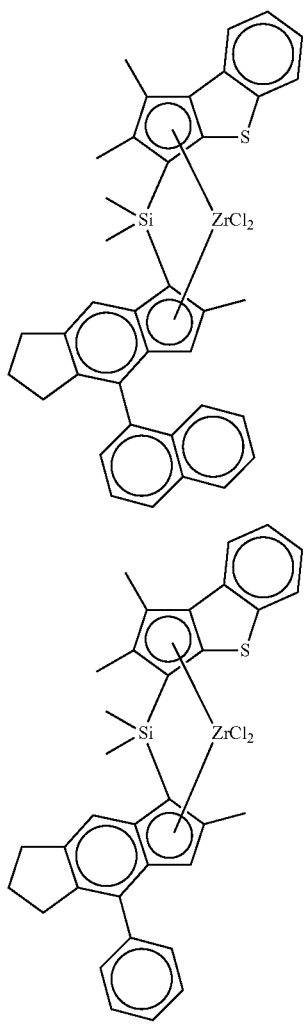
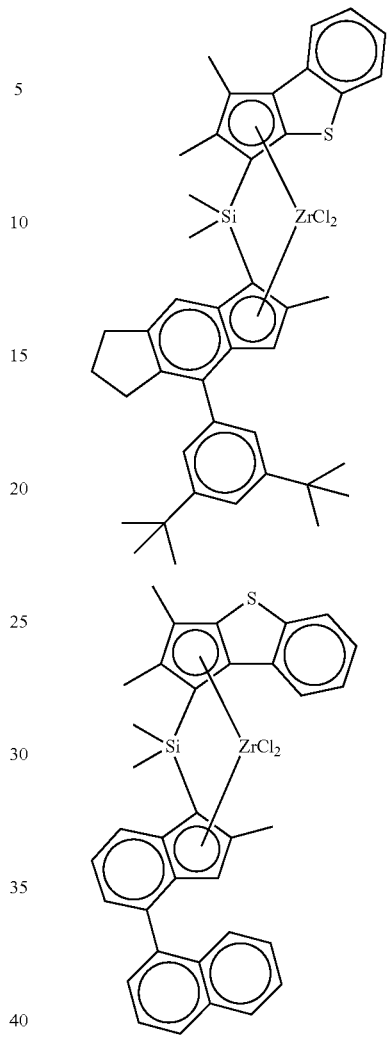
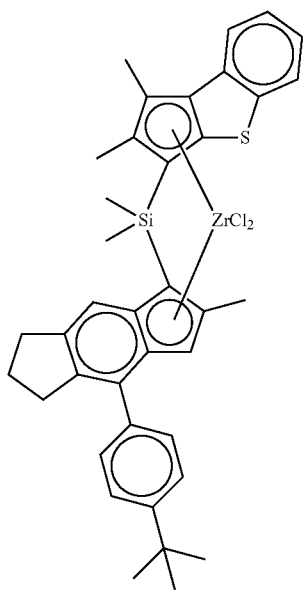
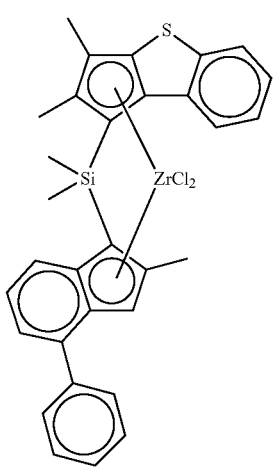

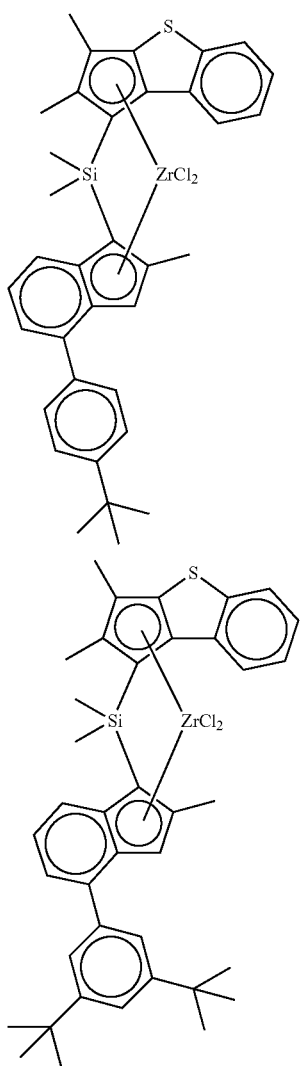
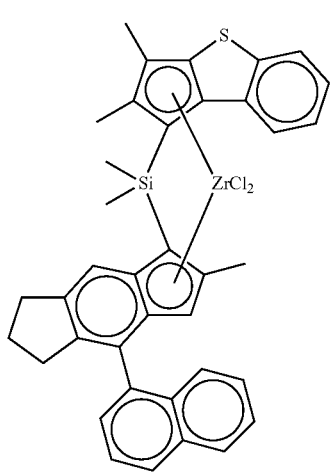
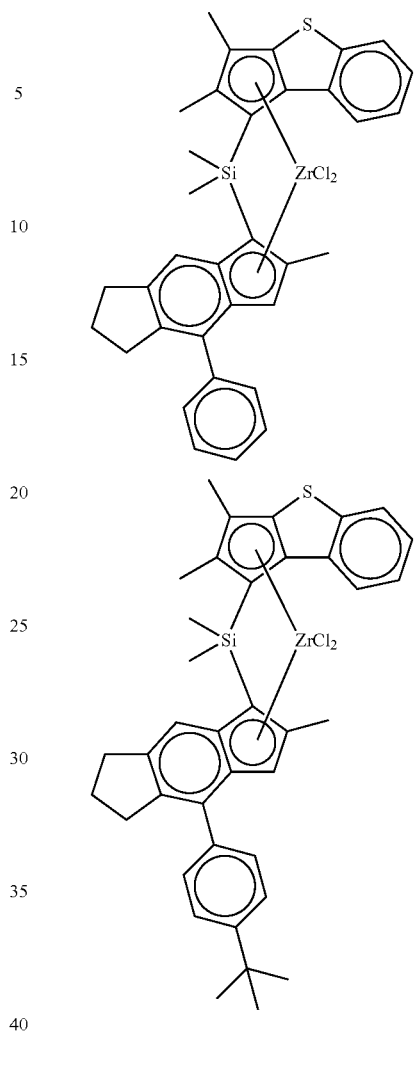
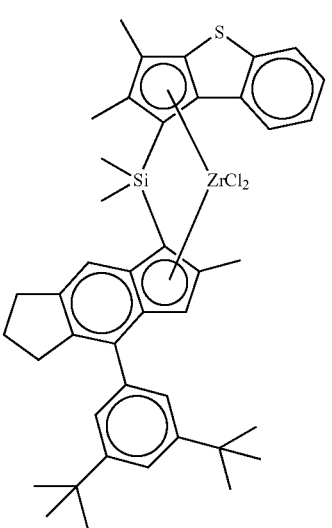

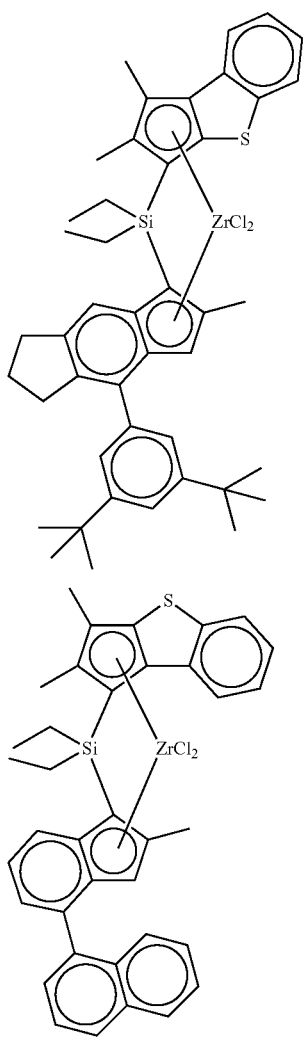
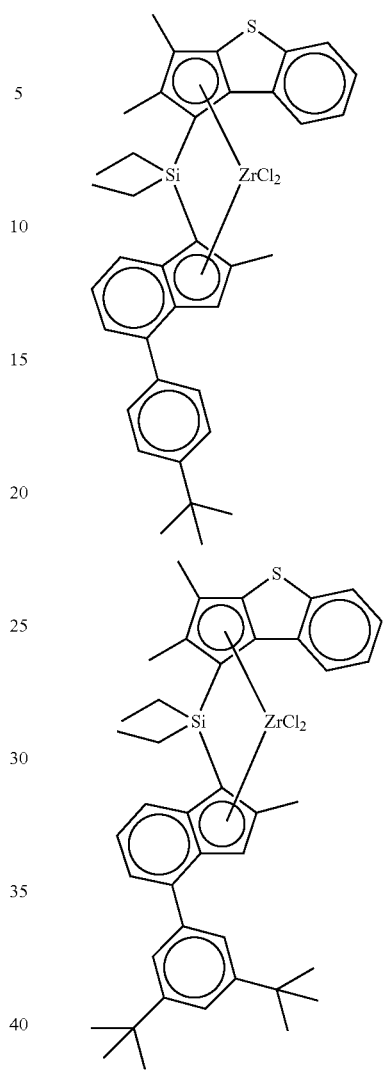
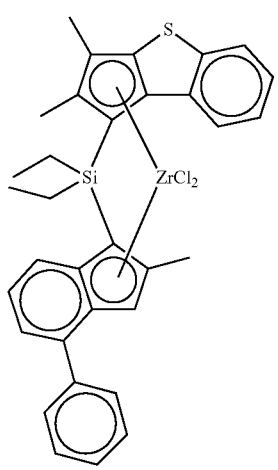
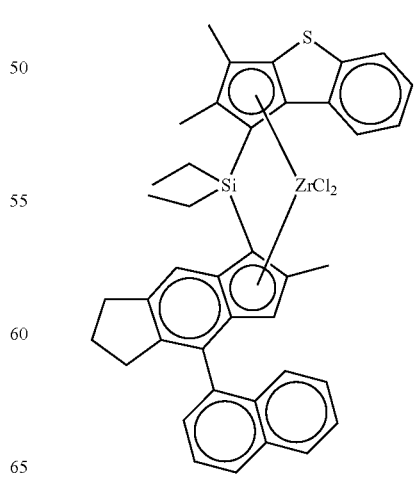

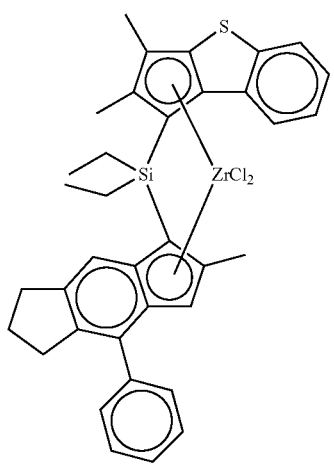

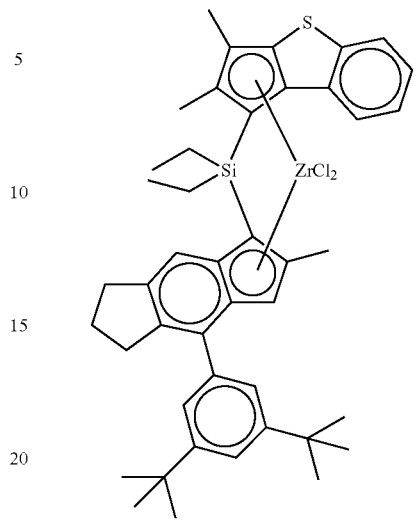

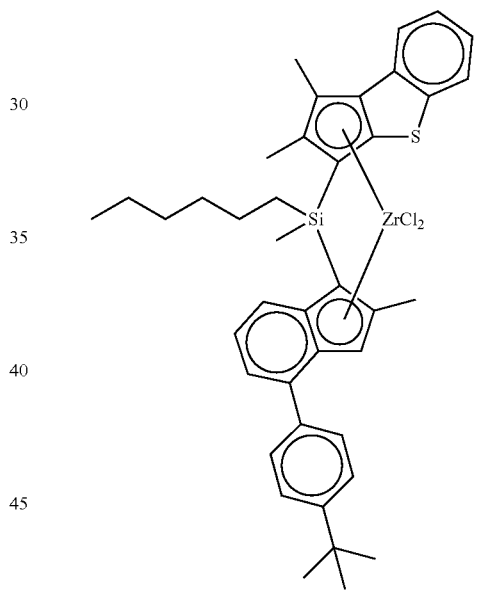

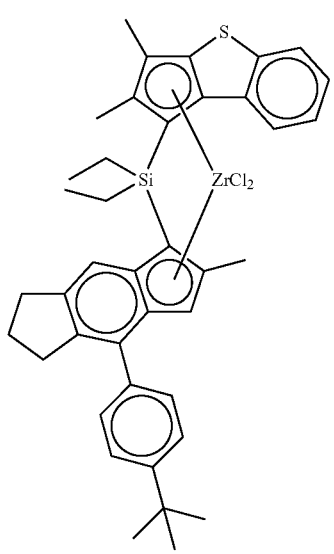

9. The hybrid supported metallocene catalyst of claim 1, wherein $Y_3$ and $Y_4$ are each independently halogen, $A_2$ is silicon, and $M_2$ is zirconium or hafnium.

10. The hybrid supported metallocene catalyst of claim 1, wherein $R_9$ and $R_{14}$ are each methyl.

11. The hybrid supported metallocene catalyst of claim 1, wherein $R_{10}$ and $R_{15}$ are each independently phenyl substituted with $C_{3-6}$ branched alkyl.

12. The hybrid supported metallocene catalyst of claim 1, wherein $R_{10}$ and $R_{15}$ are each 4-(tert-butyl)phenyl.

13. The hybrid supported metallocene catalyst of claim 1, wherein $Q_3$ and $Q_4$ are the same as each other, and are each $C_{2-4}$ linear alkyl.

14. The hybrid supported metallocene catalyst of claim 1, wherein both of $Q_3$ and $Q_4$ are ethyl.

15. The hybrid supported metallocene catalyst of claim 1, wherein the second metallocene compound is a compound represented by the following structural formula:

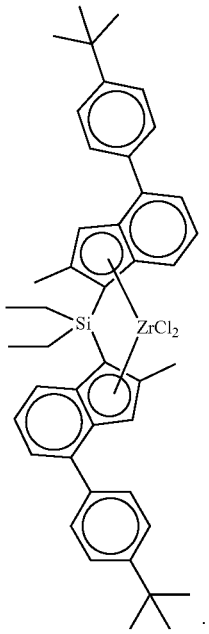

16. The hybrid supported metallocene catalyst of claim 1, wherein the first metallocene compound and the second metallocene compound are supported at a molar ratio of 1:1 to 1:8.

17. The hybrid supported metallocene catalyst of claim 1, further comprising one or more cocatalysts selected from the group consisting of compounds represented by Chemical Formulae 3 to 5:

$$[Al(R_{31})-O]_c- \qquad \text{[Chemical Formula 3]}$$

in Chemical Formula 3, $R_{31}$ is each independently halogen, $C_{1-20}$ alkyl, or $C_{1-20}$ haloalkyl, and c is an integer of 2 or more, $$D(R_{41})_3 \qquad \text{[Chemical Formula 4]}$$

in Chemical Formula 4,

D is aluminum or boron, and $R_{41}$ is each independently hydrogen, halogen, $C_{1-20}$ hydrocarbyl, or halogen-substituted $C_{1-20}$ hydrocarbyl, $$[L-H]^+[Q(E)_4]^- \text{ or } [L]^+[Q(E)_4]^- \qquad \text{[Chemical Formula 5]}$$

in Chemical Formula 5,

L is a neutral or cationic Lewis base, $[L-H]^+$ is a Bronsted acid,

Q is $B^{3+}$ or $Al^{3+}$, and

E is each independently $C_{6-40}$ aryl or $C_{1-20}$ alkyl, wherein $C_{6-40}$ aryl or $C_{1-20}$ alkyl is unsubstituted or substituted with one or more substituents selected from the group consisting of halogen, $C_{1-20}$ alkyl, $C_{1-20}$ alkoxy, and $C_{6-40}$ aryloxy.

18. A method of preparing a polypropylene, the method comprising the step of polymerizing propylene monomers in the presence of the hybrid supported metallocene catalyst of claim 1.

* * * * *